US010812830B2

(12) United States Patent
Kim et al.

(10) Patent No.: US 10,812,830 B2
(45) Date of Patent: Oct. 20, 2020

(54) METHOD AND ELECTRONIC DEVICE FOR PROCESSING RAW IMAGE ACQUIRED THROUGH CAMERA BY USING EXTERNAL ELECTRONIC DEVICE

(71) Applicant: SAMSUNG ELECTRONICS CO., LTD., Suwon-si, Gyeonggi-do (KR)

(72) Inventors: Sung-Oh Kim, Suwon-si (KR); Young-Jo Kim, Bucheon-si (KR); Hyung-Ju Chun, Hwaseong-si (KR); Jong-Bum Choi, Yongin-si (KR); Ha-Joong Park, Suwon-si (KR)

(73) Assignee: SAMSUNG ELECTRONICS CO., LTD., Suwon-si, Gyeonggi-do ( * ) Notice: Subject to any disclaimer, the term of this patent is extended or adjusted under 35 U.S.C. 154(b) by 30 days.

(21) Appl. No.: 16/155,019

(22) Filed: Oct. 9, 2018

(65) Prior Publication Data

US 2019/0110077 A1 Apr. 11, 2019

(30) Foreign Application Priority Data

Oct. 10, 2017 (KR) .......................... 10-2017-0129143

(51) Int. Cl.
*H04B 1/66* (2006.01)
*H04N 7/12* (2006.01)
(Continued)

(52) U.S. Cl.
CPC ............ *H04N 19/61* (2014.11); *G06T 5/001* (2013.01); *G06T 5/50* (2013.01); *G06T 9/00* (2013.01);
(Continued)

(58) Field of Classification Search
CPC ...................... H04N 1/00244; H04N 5/23229
See application file for complete search history.

(56) References Cited

U.S. PATENT DOCUMENTS 9,225,979 B1 * 12/2015 Jia .......................... H04N 19/176
9,311,735 B1 * 4/2016 Amirghodsi ............. G06T 5/005
(Continued)

FOREIGN PATENT DOCUMENTS

JP 2007-215001 8/2007
JP 2007215001 A * 8/2007

OTHER PUBLICATIONS

Extended Search Report dated Feb. 21, 2018 in counterpart European Patent Application No. 18199656.2.
(Continued)

*Primary Examiner* — Fabio S Lima
(74) *Attorney, Agent, or Firm* — Nixon & Vanderhye, P.C.

(57) ABSTRACT

An example electronic device includes a camera, a communication module, and at least one processor. The at least one processor is configured to acquire a raw image of an external object by using the camera, generate a first corrected image from the raw image by a first image processing scheme, control transmitting the raw image to an external electronic device through the communication module in order to enable the external electronic device to generate differential image information corresponding to a difference between a second corrected image generated by processing the raw image in the first image processing scheme and a third corrected image generated by processing the raw image in a second image processing scheme, and further correct the first corrected image by using the differential image information so that the first corrected image corresponds to the third corrected image.

20 Claims, 24 Drawing Sheets

(51) Int. Cl.
*H04N 19/61* (2014.01)
*H04N 19/176* (2014.01)
*H04N 19/159* (2014.01)
*G06T 9/00* (2006.01)
*G06T 5/50* (2006.01)
*H04N 1/00* (2006.01)
*G06T 5/00* (2006.01)
*H04N 5/232* (2006.01)

(52) U.S. Cl.
CPC ........... *H04N 1/00* (2013.01); *H04N 5/23229* (2013.01); *H04N 19/159* (2014.11); *H04N 19/176* (2014.11); *G06T 2200/16* (2013.01); *G06T 2200/28* (2013.01); *G06T 2207/10004* (2013.01); *G06T 2207/20221* (2013.01)

(56) References Cited

U.S. PATENT DOCUMENTS

| | | |
|---|---|---|
| 2004/0093432 A1 | 5/2004 | Luo et al. |
| 2011/0034209 A1 | 2/2011 | Rubinsky et al. |
| 2012/0274634 A1* | 11/2012 | Yamada ............ G06K 9/00362 |
| | | 345/419 |
| 2014/0307800 A1* | 10/2014 | Sole Rojals ......... H04N 19/176 |
| | | 375/240.18 |
| 2015/0161755 A1 | 6/2015 | Jang |
| 2015/0339809 A1* | 11/2015 | Ohishi ................... A61B 6/032 |
| | | 382/131 |
| 2015/0365644 A1* | 12/2015 | Kawakami ............. H04N 5/772 |
| | | 348/231.1 |
| 2016/0261906 A1* | 9/2016 | Jang .................... H04N 21/437 |
| 2016/0342855 A1 | 11/2016 | Hattori et al. |
| 2017/0105005 A1* | 4/2017 | Chen .................... H04N 19/105 |
| 2017/0109912 A1* | 4/2017 | Lee ............................. G06T 5/50 |
| 2017/0155917 A1 | 6/2017 | Choi et al. |

OTHER PUBLICATIONS

Search Report and Written Opinion dated Mar. 4, 2019 in counterpart International Patent Application No. PCT/KR2018/011835.
Sneyers, Jon, et al., "Free Lossless Image Format Based on Maniac Compression," IEEE, Sep. 25, 2016, pp. 66-70. XP033016470.

* cited by examiner

METHOD AND ELECTRONIC DEVICE FOR PROCESSING RAW IMAGE ACQUIRED THROUGH CAMERA BY USING EXTERNAL ELECTRONIC DEVICE

CROSS-REFERENCE TO RELATED APPLICATION(S)

This application is based on and claims priority under 35 U.S.C. § 119 to Korean Patent Application No. 10-2017-0129143, filed on Oct. 10, 2017, in the Korean Intellectual Property Office, the disclosure of which is incorporated by reference herein in its entirety.

BACKGROUND

Field

Various embodiments of the disclosure relate to methods and electronic devices for processing a raw image acquired through a camera by using an external electronic device.

Description of Related Art

An electronic device, which processes an image, may acquire a raw image through an image sensor, and process the acquired raw image by using a built-in image signal processor (ISP). The ISP may process the received raw image by an image quality enhancement algorithm, thus providing an image with an improved image quality. The ISP may perform various processes such as, but not limited to, white balancing, color adjustment (e.g., a color matrix, color correction, and color enhancement), color filter array interpolation, noise reduction (NR)/sharpening, and image enhancement (e.g., high dynamic range (HDR), and face detection). The image output from the ISP may have, for example, a YUV format. The image output from the ISP may be subjected to, for example, joint photographic experts group (JPEG) compression, and the compressed image may be stored in the electronic device.

Meanwhile, an image processing cloud system provides services for generating an image backup and new media content. A computer vision-based technique that may be difficult to perform in a terminal, such as image matching, may be applied to an image uploaded to a cloud server. For example, the cloud server may perform image recognition by using machine learning-based software.

An ISP may be disposed within an application processor (AP) in an electronic device. Due to the arrangement of an ISP in an AP, chip price and heat emission have become continuing issues. Moreover, a change in a sensor specification and the resulting modification to a processing algorithm may bring about the problem that an electronic device processing an image should be equipped with a new hardware ISP.

The above information is presented as background information only to assist with an understanding of the disclosure. No determination has been made, and no assertion is made, as to whether any of the above might be applicable as prior art with regard to the disclosure.

SUMMARY

An example electronic device for processing an image according to various embodiments may transmit a raw image to a cloud server, receive, from the cloud server, the difference between an image subjected to correction which is difficult to perform or takes too much time in an image signal processor (ISP) of the electronic device and an image corrected by the electronic device, and generate the image corrected by the cloud server based on the image corrected by the electronic device and the received difference.

In accordance with an aspect of the disclosure, an electronic device may include a camera, a communication module (including, for example, communication circuitry), and at least one processor. The at least one processor may be configured to acquire a raw image of an external object by using the camera, to generate a first corrected image from the raw image by a first image processing scheme, to transmit the raw image to an external electronic device through the communication module in order to enable the external electronic device to generate differential image information corresponding to a difference between a second corrected image generated by processing the raw image in the first image processing scheme and a third corrected image generated by processing the raw image in a second image processing scheme, and to further correct the first corrected image by using the differential image information in order to make the first corrected image correspond to the third corrected image.

In accordance with another aspect of the disclosure, an electronic device may include a communication module (including, for example, communication circuitry), and at least one processor. The at least one processor may be configured to receive a raw image acquired by an external electronic device through the communication module, to generate differential image information corresponding to a difference between a first corrected image and a second corrected image, the first corrected image being generated by processing the raw image in a first image processing scheme set in correspondence with the external electronic device, and the second corrected image being generated by processing the raw image in a second image processing scheme set in correspondence with the electronic device, and to transmit the differential image information to the external electronic device through the communication module.

In accordance with another aspect of the disclosure, an electronic device may include a camera, a communication module, and at least one processor. The at least one processor may be configured to acquire a raw image of an external object by using the camera, to generate a first converted image by converting a format of the raw image to a predetermined format, to transmit the raw image to the external electronic device through the communication module, to receive differential image information corresponding to a difference between a second converted image and a first corrected image from the external electronic device through the communication module, the second converted image being generated by converting the format of the raw image to the predetermined format, and the first corrected image being generated by applying an image processing scheme stored in the external electronic device to the raw image, and to generate a second corrected image corresponding to the first corrected image by using the received differential image information and the first converted image.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
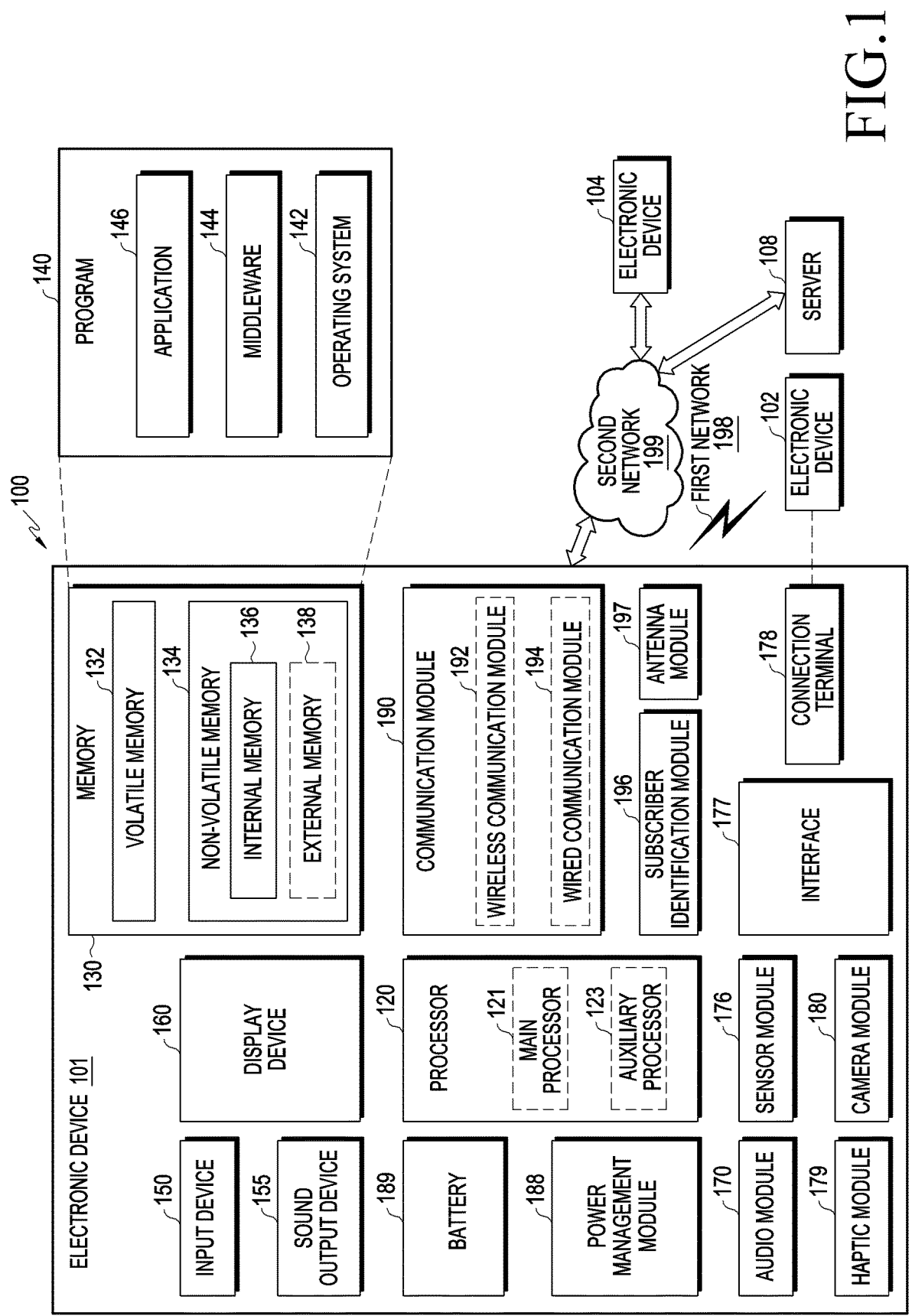
FIG. 1 is a block diagram illustrating an electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an example embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and/or an antenna module 197. In some example embodiments, at least one (e.g., the display device 160 or the camera module 180) of the components may be omitted from the electronic device 101, or one or more other components may be included in the electronic device 101. In some example embodiments, some of the components may be implemented as single integrated circuitry. For example, the sensor module 176 (e.g., a fingerprint sensor, an iris sensor, or an illuminance sensor) may be implemented by being embedded in the display device 160 (e.g., a display).

The processor (including, for example, processing circuitry) 120 may execute, for example, software (e.g., a program 140) containing one or more instructions that are stored in a machine (e.g., computer) readable storage medium (e.g., internal memory or external memory). The software can control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an example embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of, the main processor 121. The auxiliary processor 123 may control at least some functions or states related to at least one component (e.g., the display device 160, the sensor module 176, or the communication module 190) among the components of the electronic device 101, instead of the main processor 121, while the main processor 121 is in an inactive (e.g., sleep) state, or, together with the main processor 121, while the main processor 121 is in an active state (e.g., executing an application). According to an example embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example and without limitation, software (e.g., the program 140) and input data or output data for a command or instruction related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input device (including, for example, input circuitry) 150 may receive a command or data to be used by other component (e.g., the processor 120) of the electronic device 101, from the outside (e.g., a user) of the electronic device 101. The input device 150 may include, for example and without limitation, a microphone, a mouse, or a keyboard.

The sound output device (including, for example, sound output circuitry) 155 may output sound signals to the outside of the electronic device 101. The sound output device 155 may include, for example and without limitation, a speaker or a receiver. The speaker may be used for general purposes, such as playing multimedia or playing recordings, and the receiver may be used for incoming calls. According to an example embodiment, the receiver may be implemented as separate from, or as part of the speaker.

The display device 160 may visually provide information to the outside (e.g., a user) of the electronic device 101. The display device 160 may include, for example and without limitation, a display, a hologram device, and/or a projector and control circuitry to control a corresponding one of the display, hologram device, and projector. According to an example embodiment, the display device 160 may include touch circuitry adapted to detect a touch, and/or sensor circuitry (e.g., a pressure sensor) adapted to measure the intensity of force incurred by the touch.

The audio module (including, for example, audio circuitry) 170 may convert a sound into an electrical signal and vice versa. According to an example embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module (including, for example, one or more sensors and associated circuitry) 176 may detect an operational state (e.g., power or temperature) of the electronic device 101 or an environmental state (e.g., a state of a user) external to the electronic device 101, and then generate an electrical signal or data value corresponding to the detected state. According to an example embodiment, the sensor module 176 may include, for example and without limitation, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface (including, for example, interface circuitry) 177 may support one or more specified protocols to be used for the electronic device 101 to be coupled with the external electronic device (e.g., the electronic device 102) directly (e.g., wiredly) or wirelessly. According to an example embodiment, the interface 177 may include, for example and without limitation, a high definition multimedia interface (HDMI), a universal serial bus (USB) interface, a secure digital (SD) card interface, and/or an audio interface.

A connecting terminal 178 may include a connector via which the electronic device 101 may be physically connected with the external electronic device (e.g., the electronic device 102). According to an example embodiment, the connecting terminal 178 may include, for example and without limitation, a HDMI connector, a USB connector, a SD card connector, and/or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example and without limitation, a motor, a piezoelectric element, and/or an electric stimulator, and associated circuitry.

The camera module (including, for example, one or more cameras and associated circuitry) 180 may capture a still image or moving images. According to an example embodiment, the camera module 180 may include one or more lenses, image sensors, image signal processors, and/or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an example embodiment, the battery 189 may include, for example, a primary cell which is not rechargeable, a secondary cell which is rechargeable, and/or a fuel cell.

The communication module (including, for example, communication circuitry) 190 may support establishing a direct (e.g., wired) communication channel and/or a wireless communication channel between the electronic device 101 and the external electronic device (e.g., the electronic device 102, the electronic device 104, and/or the server 108) and performing communication via the established communication channel. The communication module 190 may include one or more communication processors that are operable independently from the processor 120 (e.g., the application processor (AP)) and support a direct (e.g., wired) communication or a wireless communication. According to an example embodiment, the communication module 190 may include a wireless communication module 192 (e.g., a cellular communication module, a short-range wireless communication module, and/or a global navigation satellite system (GNSS) communication module) or a wired communication module 194 (e.g., a local area network (LAN) communication module and/or a power line communication (PLC) module). A corresponding one of these communication modules may communicate with the external electronic device via the first network 198 (e.g., a short-range communication network, such as Bluetooth™ wireless-fidelity (Wi-Fi) direct, and/or infrared data association (IrDA)) and/or the second network 199 (e.g., a long-range communication network, such as a cellular network, the Internet, and/or a computer network (e.g., LAN or wide area network (WAN)). These various types of communication modules may be implemented as a single component (e.g., a single chip), or may be implemented as multi components (e.g., multi chips) separate from each other.

According to an example embodiment, the wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an example embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), and/or mobile industry processor interface (MIPI)).

According to an example embodiment, commands or data may be transmitted or received between the electronic device 101 and the external electronic device 104 via the server 108 coupled with the second network 199. Each of the electronic devices 102 and 104 may be a device of a same type as, or a different type from, the electronic device 101. According to an example embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
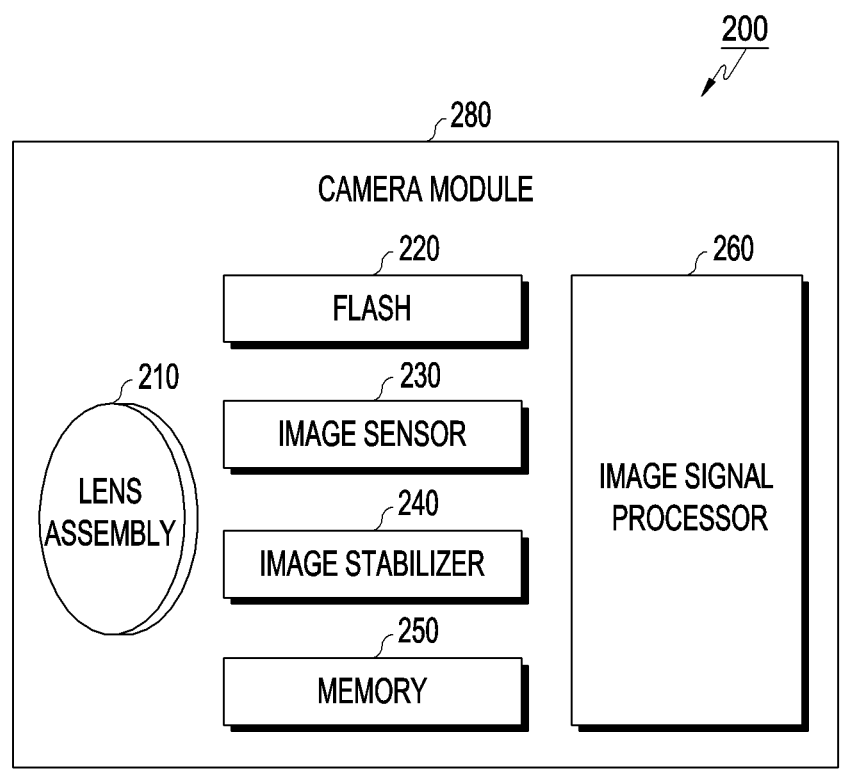
FIG. 2A is a block diagram illustrating a camera module according to various embodiments.

FIG. 2A is a block diagram 200 illustrating the camera module 180 according to various embodiments. Referring to FIG. 2A, the camera module 180 may include a lens assembly 210, a flash 220, an image sensor 230, an image stabilizer 240, memory 250 (e.g., buffer memory), and/or an image signal processor 260. The lens assembly 210 may collect light emitted or reflected from an object whose image is to be taken. The lens assembly 210 may include one or more lenses. According to an example embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens. The flash 220 may emit light that is used to reinforce light reflected from an object. According to an example embodiment, the flash 220 may include one or more light emitting diodes (LEDs) (e.g., a red-green-blue (RGB) LED, a white LED, an infrared (IR) LED, and/or an ultraviolet (UV) LED) and/or a xenon lamp.

The image sensor 230 may obtain an image corresponding to an object by converting light emitted or reflected from the object and transmitted via the lens assembly 210 into an electrical signal. According to an example embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an example embodiment, the image stabilizer 240 may sense such a movement by the camera module 180 or the electronic device 101 using a gyro sensor (not shown) and/or an acceleration sensor (not shown) disposed inside or outside the camera module 180. According to an example embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an example embodiment, the memory 250 may be configured as at least part of the memory 130 or as a separate memory that is operated independently from the memory 130.

The image signal processor 260 may perform one or more types of image processing with respect to an image obtained via the image sensor 230 or an image stored in the memory 250. The one or more types of image processing may include, for example and without limitation, depth map generation, three-dimensional (3D) modeling, panorama generation, feature point extraction, image synthesizing, and/or image compensation (e.g., noise reduction, resolution adjustment, brightness adjustment, blurring, sharpening, and/or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an example embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an example embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 2B:
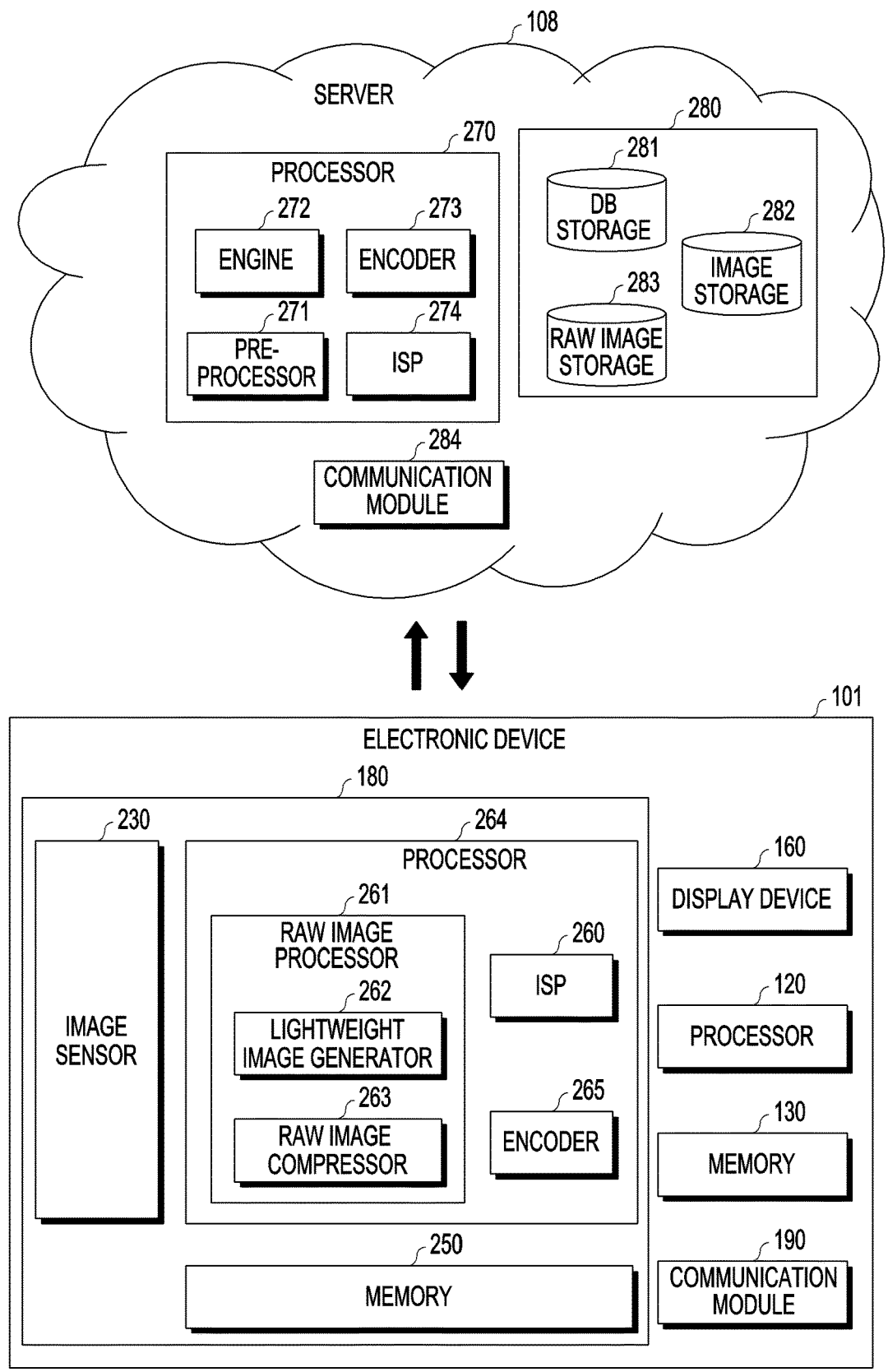
FIG. 2B is a block diagram illustrating an electronic device and a server according to various embodiments.

FIG. 2B is a block diagram illustrating an electronic device and a server according to various embodiments.

Referring to FIG. 2B, according to various embodiments, the electronic device 101 may include the processor 120, the memory 130, the display device 160, the camera module 180, and the communication module 190. The server 108 may include a processor 270, a memory 280, and a communication module (including, for example, communication circuitry) 284. According to an example embodiment, the camera module 180 may include an image sensor 230, a processor 264, and a memory 250. The processor 264 may include a raw image processor 261, an image signal processor (ISP) 260, and an encoder 265, and the raw image processor 261 may include a lightweight image generator 262 and a raw image compressor 263. The processor 270 may include a pre-processor 271, an engine 272, an encoder 273, and an ISP 274. The memory 280 may include a database (DB) storage 281, an image storage 282, and a raw image storage 283.

According to various embodiments, the image sensor 230 may acquire a raw image of an object in various formats. For example, the image sensor 230 may acquire a raw image in various formats according to a color filter array (CFA) pattern. If the image sensor 230 includes a dual pixel structure (or a 2 photo diode (2PD) structure), the image sensor 230 may acquire a raw image including information about different phase differences (or time differences) in one pixel. Further, the image sensor 230 may include a plurality of image sensors having the same or different properties, for example and without limitation, a dual sensor (e.g., RGB sensor+RGB sensor, RGB sensor+mono sensor, or wide angle sensor+tele-sensor), and/or an array sensor including a plurality of sensors. In this case, the image sensor 230 may acquire one or more raw images for one scene. The acquired raw images may be stored in the memory 130 or the memory 250 as they are or after additional processing.

According to various embodiments, the image sensor 230 may acquire a raw image in various formats. For example, if the raw image is in a Bayer format, a pixel may be represented in one of red, green and blue, and with a bit depth of 8 to 16 bits in the raw image. For example, a CFA pattern may be applied to the raw image. The raw image may be in a layer structure having information about a plurality of colors (e.g., two or more of red, green, and blue) per pixel. The image sensor 230 may acquire, for example, a raw image having phase difference information in addition to color information (RGB information). Metadata for information related to image capturing (e.g., a capturing time, position, and illuminance) may be stored in relation to the raw image.

According to various embodiments, the processor 264 may perform various processes related to the raw image received from the image sensor 230. The processor 264 may be implemented independently or incorporated into another processor (e.g., the processor 120). At least one of the lightweight image generator 262, the raw image compressor 263, the ISP 260, or the encoder 265 in the processor 264 may be incorporated into another processor (e.g., the processor 120). The processor 264 may reside inside or outside the camera module 180 (e.g., in the electronic device 101 or the server 108), or both inside and outside the camera module 180. A process performed in the processor 264 may be performed alone by the processor 264 or in a distributed manner by a plurality of processors.

According to various embodiments, the raw image processor 261 may perform various processes on the raw image acquired from the image sensor 230. For example, the raw image processor 261 may perform lens distortion compensation on the raw image and/or cancel at least part of noise. The lightweight image generator 262 may generate a lightweight image smaller in size than the raw image by using the raw image. Since the raw image may be relatively large in size, the lightweight image generator 262 may generate a lightweight image smaller than the raw image before storing, processing or transmitting the raw image. For example, the lightweight image generator 262 may generate a lightweight image by performing various processes on the raw image, such as down-scaling, down-sampling, or compression. Down-scaling may refer to, for example, a process of reducing the size or resolution of a raw image. Down-sampling may refer to a process of generating a lightweight image by selecting only one or a part of a plurality of samples resulting from sampling. The raw image compressor 263 may compress the raw image or the lightweight image by various image compression algorithms, not limited to any particular compression scheme.

The ISP 260 may perform an image process on the image acquired through the image sensor 230 or stored in the memory 250, as described before with reference to FIG. 2A. The encoder 265 may generate an encoded image by encoding the raw image. The encoded image may have various formats such as joint photographic coding experts group (JPEG), moving picture experts group (MPEG), and/or a 360-degree image format.

According to various embodiments, at least one of the raw image, the lightweight image, the compressed image, or the encoded image may be stored temporarily or non-transitorily in the memory 250. The processor 120 may transmit at least one of the raw image or the compressed image to the server 108 through, for example, the communication module 190. The server 108 may receive the at least one of the raw image or the compressed image through the communication module 284. The communication module 284 may communicate with, for example, the communication module 190. The server 108 may be responsible for network management, service management related to available services and authorization, storage management, and so on for the electronic device 101. The raw image may be stored temporarily or non-transitorily in the raw image storage 283 of the server 108.

According to various embodiments, the pre-processor 271 may perform a required process before transmitting the received raw image to the engine 272 or the ISP 274. For example, if the pre-processor 271 receives the compressed raw image through the communication module 284, the pre-processor 271 may decompress the compressed raw image, thereby acquiring the raw image. Further, the pre-processor 271 may receive the raw image through the communication module 284. The pre-processor 271 may perform at least one of an image quality enhancing algorithm, de-mosaicing, or image format conversion for the raw image which has been received or acquired by decompression.

According to various embodiments, the engine 272 may perform various operations (e.g., object recognition, velocity vector decision, face recognition, segmentation, scene parsing, and/or texture recognition) by analyzing the raw image (or image file). The engine 272 may use various algorithms to perform the various operations. According to various embodiments, since the server 108 may have a relatively high computation capability, a relatively large storage size, and relatively large resources, the server 108 may use a high computation-requiring algorithm, and a new developed algorithm. The engine 272 may generate, store and/or transmit correction area information (e.g., an object recognition result, a velocity vector, a face recognition result, a segmentation result, a scene category, and/or texture information) available to the ISP 274 as a result of the various operations. The engine 272 may generate correction area information in the form of a plurality of layers. The correction area information generated by the engine 272 will be described in greater detail with reference to FIGS. 2C and 2D.

According to various embodiments, the ISP 274 may perform various image processes on the raw image by using various pieces of information (e.g., the correction area information) about the raw image analyzed by the engine 272. In another example embodiment, the electronic device 101 may receive the correction area information, and perform an image process by using the received correction area information. In this case, the electronic device 101 may perform an image process provided by the ISP 260 and the image process based on the correction area information, in combination. The electronic device 101 may store the image for which the image process has been performed, temporarily or non-transitorily in the memory 130, or display the image on the display device 160.

Meanwhile, if the ISP 274 performs an image process as described above, the ISP 274 may perform the image process based on the correction area information. The ISP 274 may receive additional information (e.g., a feature vector) corresponding to the correction area information from the DB storage 281, and use the received additional information in the image process. The DB storage 281 may store various pieces of feature information corresponding to image categories or the like. The processed image may be transmitted again to the electronic device 101, or stored in the image storage 282 of the server 108. The ISP 274 may perform, at least based on the correction area information, various processes such as white balancing, color adjustment (e.g., a color matrix, color correction, and/or color enhancement), color filter array interpolation, NR/sharpening, and/or image enhancement (e.g., HDR and face detection). The ISP 274 may also perform an image process requiring a large computation volume, such as original color mapping, detail regeneration, text reconstruction, image inpainting, or the like.

According to various embodiments, the processor 270 may perform a first image processing scheme on the raw image processed by the pre-processor 271, and perform a second image processing scheme different from the first image process scheme, on the raw image. That is, the processor 270 may perform a plurality of different image processes on one raw image, and thus generate a first corrected image as a result of the first image process and a second corrected image as a result of the second image process. The processor 270 may compare the first corrected image with the second corrected image, and generate a differential image based on the comparison result. The first image process may be identical to the image process performed in the ISP 260 of the electronic device 101. The second image process may be, for example and without limitation, an image process which may be performed based on the correction area information from the engine 272, and/or an image process requiring a larger computation volume or larger resources than the first image process. For example, an image on which the second image process has been performed may be an image for which higher-level correction has been performed than an image on which the first image process has been performed. The pixel value of each pixel in the differential image may be calculated by subtracting the pixel value of each pixel in the first corrected image from the pixel value of each corresponding pixel in the second corrected image. The processor 270 may transmit the differential image or a compressed differential image obtained by compressing the differential image to the electronic device 101 through the communication module 284. The processor 120 may generate an image substantially identical to the second corrected image by using the received differential image and the image processed by the ISP 260, which will be described later in greater detail.

Figure 2C:
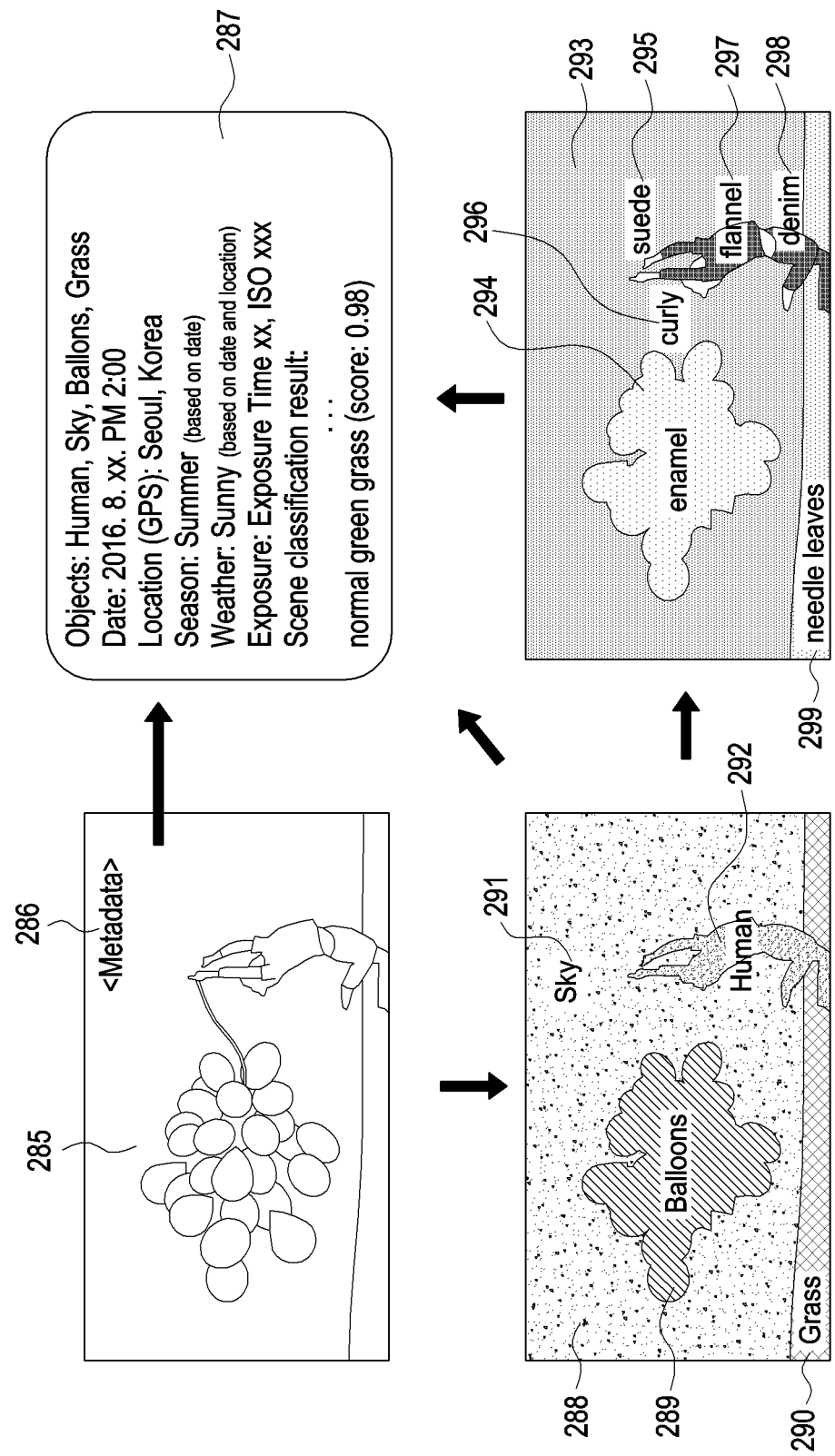
FIGS. 2C and 2D are views depicting correction area information generated by a server according to various embodiments.
Figure 2D:
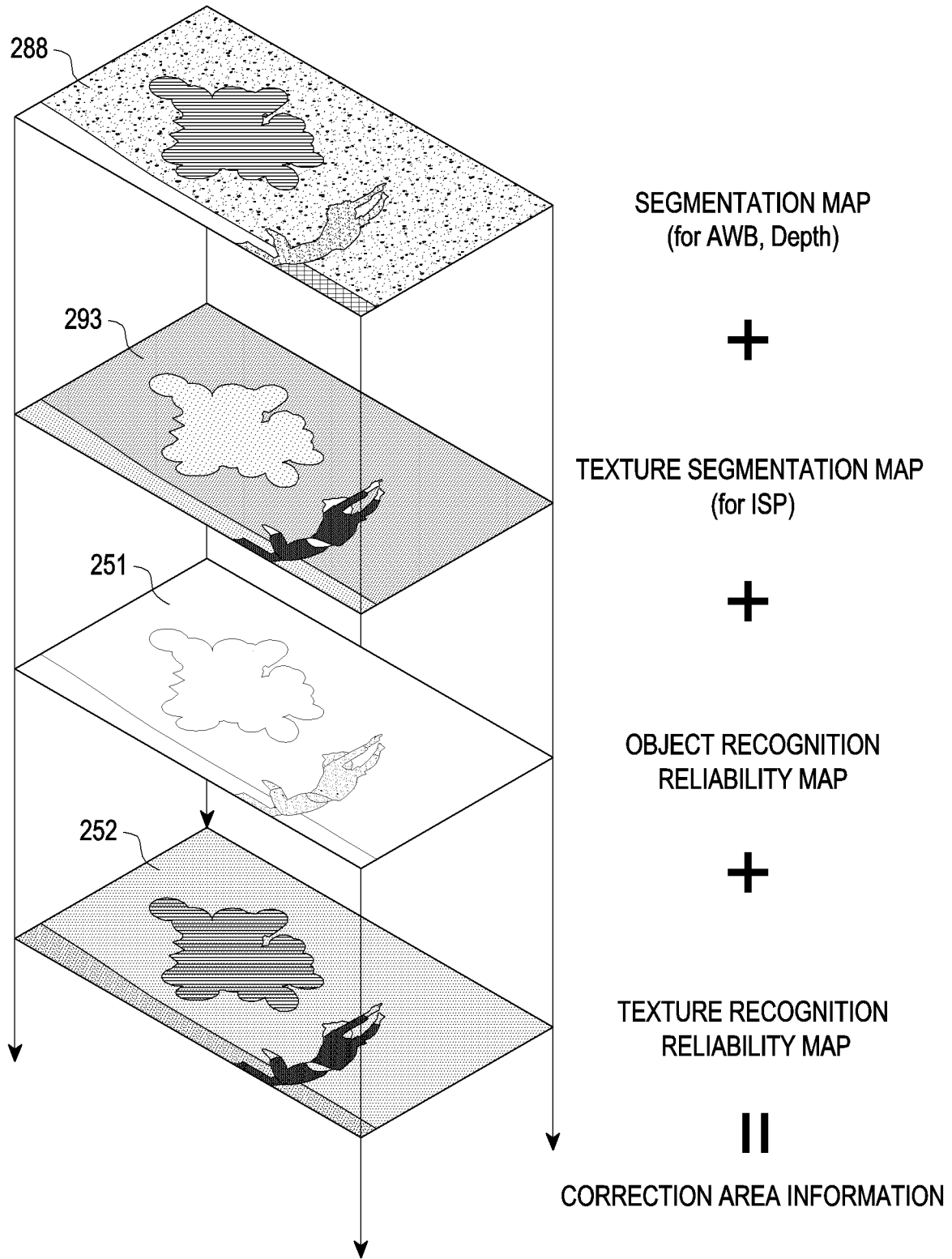

FIGS. 2C and 2D are views depicting correction area information generated by a server according to various embodiments.

The server 108 may acquire, for example, a raw image 285 illustrated in FIG. 2C. The server 108 may additionally receive metadata 286 for the raw image 285. The metadata 286 may include information about a focal length, an auto focus area, left and right orientations during capturing, a color space, an exposure time, aperture-related information (Fnumber), a capturing mode (exposure program) (e.g.: auto, aperture first, shutter first, manual, and/or the like), international organization for standardization (ISO) speed ratings, a data time original, and/or the like. Further, while not shown, the metadata 286 may include information sensed by a sensor other than an image sensor, such as an image capture location or an illuminance at the moment of image capturing. The server 108 (e.g., the engine 272) may perform object segmentation and recognition for the raw image 285. An object may mean an area obtained by segmenting the raw image 285, and may be referred to as an image area. For example, the server 108 may acquire a segmentation map 288 as illustrated in FIG. 2D. The server 108 may separate objects 289, 290, 291, and 292 from the raw image 285 based on various features of the raw image 285, such as edges, blobs, and so on. The server 108 may apply a recognition algorithm to each of the objects 289, 290, 291, and 292, and thus acquire recognition results. For example, the external electronic device (e.g., a processor of the external electronic device) may acquire the results of recognizing the objects 289, 290, 291, and 292 by using a recognition algorithm acquired by subjecting a large amount of DB to machine learning or deep learning. The server 108 may acquire a recognition result indicating sky for the first object 291, a recognition result indicating balloons for the second object 289, a recognition result indicating a human for the third object 292, and a recognition result indicating grass for the fourth object 290. The server 108 may acquire the segmentation map 288 including position information (or pixel coordinates information) about the objects 289, 290, 291, and 292, and the recognition results of the objects 289, 290, 291, and 292.

The server 108 (e.g., the engine 272) may perform texture segmentation and recognition for the raw image 285. The server 108 may acquire a texture segmentation map 293, as illustrated in FIG. 2D. The server 108 may perform texture recognition, for example, for the objects 289, 290, 291, and 292 for which the object recognition has been performed, or further divide at least one of the objects 289, 290, 291, and 292 into segments and acquire a texture recognition result for each segment. Texture may mean a component representing a predefined pattern or texture. A plurality of textures may be included in one object. A texture recognition algorithm may also be acquired by subjecting a large amount of DB to machine learning or deep learning. The server 108 may acquire the texture segmentation map 293 including position information (or pixel coordinates information) about a plurality of texture objects 294, 295, 296, 297, 298, and 299 and the texture recognition results.

The server 108 (e.g., the engine 272) may determine the reliability of the recognition results of the raw image 285. The server 108 may determine at least one of the reliability of the object recognition results or the reliability of the texture recognition results. The server 108 may determine classification information 287 about the raw image 285. The classification information 287 may represent overall content of the raw image 285. The server 108 may acquire the classification information 287 by applying an image classification algorithm to the raw image 285. The server 108 may acquire the classification information 287 by using at least one of the object recognition results or the texture recognition results. Further, the server 108 may acquire the classification information 287 directly from the raw image 285. The classification information 287 may include overall scene classification result information representing, for example, normal green grass. The classification information 287 may include object information (e.g., sky, balloons, and grass), date information (e.g., 2016. 8. xx. PM 2:00), place information (e.g., Seoul, Korea), season information (e.g., summer), weather information (e.g., sunny), exposure-related information (exposure time xx, and ISO xxx), and so on. The server 108 may acquire the classification information 287 by using the results of applying the recognition algorithm and the metadata.

The server 108 may generate correction area information including at least one of information about the object recognition, the texture recognition, the reliabilities of the recognition results, or the classification information. For example, as illustrated in FIG. 2D, the server 108 may generate correction area information in a plurality of layers. The multi-layer correction area information may include the segmentation map 288, the texture segmentation map 293, an object recognition reliability map 251, and a texture recognition reliability map 252. The coordinates of pixels may be identical in the plurality of maps 288, 293, 251, and 252, and correspond to the pixels of the raw image. Accordingly, a plurality of pieces of information (e.g., an object attribute, a texture attribute, the accuracy of the object attribute, and/or the accuracy of the texture attribute) may correspond to one pixel of the raw image. The server 108 (e.g., the ISP 274) may perform an image process by using the multi-layer correction area information. For example, the ISP 274 may apply an effect corresponding to balloons to pixels of the raw image corresponding to the pixel coordinates of an object being the balloons in the segmentation map 288. The ISP 274 may apply an effect corresponding enamel to pixels of the raw image corresponding to the pixel coordinates of a texture object being enamel in the texture segmentation map 293. The ISP 274 may adjust the level of an applied effect in consideration of the object recognition reliability or the texture recognition reliability. The ISP 274 may apply an effect corresponding to an outdoor environment to the whole raw image based on the image classification result (e.g., normal green grass). The server 108 may transmit the difference between the correction effect-applied image and the image corrected by the electronic device 101 to the electronic device 101. The electronic device 101 may generate the image corrected by the server 108 by using the image corrected in the electronic device 101 and the received difference, which will be described later in greater detail. Further, the server 108 may transmit the correction area information to the electronic device 101, and the electronic device 101 may perform an image process based on the received correction area information. The correction area information configured in a plurality of layers illustrated in FIG. 2D is a mere example. Thus, the correction area information may be configured as one-dimensional text information, not limited to any particular data format. One or more layers may be omitted from and one or more maps may be added to the plurality of layers illustrated in FIG. 2D.

According to various embodiments, the server 108 may process at least one of a second corrected image or a third corrected image by the process described before with reference to FIGS. 2C and 2D. To process the second corrected image, the server 108 may use at least part of the process described before with reference to FIGS. 2C and 2D, and additionally, another process. To process the third corrected image, the server 108 may use at least part of the process described before with reference to FIGS. 2C and 2D, and additionally, another process. In various embodiments, a process for the third corrected image may take a larger computation volume than a process for the second corrected image. Accordingly, the third corrected image may be an image for which finer correction has been performed.

According to various embodiments, at least one processor (e.g., at least one of the processor 120 or the processor 264) may be configured to control acquiring a raw image of an external object by using a camera (e.g., the camera module 180 or the image sensor 230), to generate a first corrected image from the raw image by a first image processing scheme, to control transmitting the raw image to an external electronic device (e.g., the server 108) through a communication module (e.g., the communication module 190), so that the external electronic device (e.g., the server 108) may generate differential image information corresponding to the difference between a second corrected image and a third corrected image, the second corrected image being generated by processing the raw image in the first image processing scheme and the third corrected image being generated by processing the raw image in a second image processing scheme, and to further correct the first corrected image based on the differential image information so that the corrected first image may correspond to the third corrected image.

According to various embodiments, the at least one processor (e.g., at least one of the processor 120 or the processor 264) may be configured to, as at least part of the operation of generating the first corrected image, generate the first corrected image by the first image processing scheme, the first image processing scheme being used for a first effect corresponding to at least one area of the raw image.

According to various embodiments, the at least one processor (e.g., at least one of the processor 120 or the processor 264) may be configured to receive the differential image information generated based on the difference between the second corrected image generated in the first image processing scheme and the third corrected image generated in the second image processing scheme, the first image processing scheme being used for the first effect, and the second image processing scheme being used for a second effect corresponding to at least one area of the raw image. The second image processing scheme may require a larger computation volume than the first image processing scheme.

According to various embodiments, the at least one processor (e.g., at least one of the processor 120 or the processor 264) may be configured to control receiving, from the external electronic device (e.g., the server 108), compressed differential image information generated by losslessly compressing the differential image information.

According to various embodiments, the at least one processor (e.g., at least one of the processor 120 or the processor 264) may be configured to acquire the differential image by decompressing the received compressed differential image information based on the lossless compression.

According to various embodiments, as at least part of the operation of further correcting the first corrected image, the at least one processor (e.g., at least one of the processor 120 or the processor 264) may be configured to generate an image corresponding to the third corrected image by adding the differential image and the first corrected image.

According to various embodiments, as part of the operation of transmitting the raw image to the external electronic device through the communication module, the at least one processor (e.g., at least one of the processor 120 or the processor 264) may be configured to generate a compressed raw image by compressing the raw image, and to control transmitting the compressed raw image to the external electronic device (e.g., the server 108) through the communication module 190.

According to various embodiments, the at least one processor (e.g., at least one of the processor 120 or the processor 264) may be configured to control receiving the differential image information generated based on the second corrected image and the third corrected image, the second corrected image being generated in the first image processing scheme after the compressed raw image is decompressed, and the third corrected image being generated in the second image processing scheme after the compressed raw image is decompressed.

According to various embodiments, as at least part of the operation of transmitting the raw image to the external electronic device through the communication module, the at least one processor (e.g., at least one of the processor 120 or the processor 264) may be configured to control transmitting, to the external electronic device (e.g., the server 108), at least one piece of identification information identifying at least one of the electronic device 101, at least part of information related to the at least one processor (e.g., at least one of the processor 120 or the processor 264), or the first image processing scheme stored in the electronic device 101.

According to various embodiments, the at least one processor (e.g., at least one of the processor 120 or the processor 264) may be configured to control receiving the differential image information generated based on the difference between the second corrected image generated in the first image processing scheme, and the third corrected image, the first image processing scheme being selected based on at least the at least one piece of identification information.

According to various embodiments, the at least one piece of identification information may be included in metadata of the raw image or configured independently of data of the raw image.

According to various embodiments, the at least one processor (e.g., at least one of the processor 120 or the processor 264) may be configured to generate a first encoded image by encoding the first corrected image in a first encoding scheme which does not require another frame image, among high efficiency video coding (HEVC) encoding schemes.

According to various embodiments, the at least one processor (e.g., at least one of the processor 120 or the processor 264) may be configured to control receiving a second encoded image from the external electronic device (e.g., the server 108) through the communication module 190, the second encoded image being obtained by encoding the third corrected image in a second encoding scheme requiring another frame image among the HEVC encoding scheme, referring to the second corrected image.

According to various embodiments, as at least part of the operation of further correcting the first corrected image, the at least one processor (e.g., at least one of the processor 120 or the processor 264) may be configured to decode the first encoded image and the second encoded image, thereby generating an image corresponding to the third corrected image.

According to various embodiments, the at least one processor (e.g., at least one of the processor 120 or the processor 264) may be configured to control acquiring a raw image of an external object by using the camera (e.g., the camera module 180 and/or the image sensor 230), to generate a first converted image by converting a format of the raw image to a predetermined format, to control transmitting the raw image to the external electronic device through the communication module, to control receiving differential image information between a second converted image and a first corrected image from the external electronic device through the communication module 190, the second converted image being generated by converting the format of the raw image to the predetermined format, and the first corrected image being generated by applying an image processing scheme stored in the external electronic device to the raw image, and to generate a second corrected image corresponding to the first corrected image by using the received differential image information and the first converted image.

According to various embodiments, the at least one processor (e.g., at least one of the processor 120 or the processor 264) may be configured to acquire a raw image of an external object by using the camera (e.g., the camera module 180 and/or the image sensor 230), to generate a first corrected image for the raw image and store the first corrected image in the memory 230, if the communication module 190 is turned off, and to control transmitting the raw image to the external electronic device (e.g., the server 108) through the communication module 190, control receiving first data from the external electronic device (e.g., the server 108), generate a second corrected image by using the first data and the first corrected image, and store the second corrected image in the memory 130, if the communication module 190 is turned on.

According to various embodiments, at least one processor (e.g., the processor 270) may be configured to control receiving a raw image acquired by an external electronic device (e.g., the electronic device 101), through a communication module (e.g., the communication module 284), to generate differential image information corresponding to a difference between a first corrected image and a second corrected image, the first corrected image being generated in a first image processing scheme set in correspondence with the external electronic device (e.g., the electronic device 101), and the second corrected image being generated in a second image processing scheme set in correspondence with an electronic device (e.g., the server 108), and to control transmitting the differential image information to the external electronic device (e.g., the electronic device 101) through the communication module (e.g., the communication module 284).

According to various embodiments, as at least part of the operation of generating the differential image information, the at least one processor (e.g., the processor 270) may be configured to generate compressed differential image information by losslessly compressing the differential image information.

According to various embodiments, as at least part of the operation of receiving the raw image, the at least one processor (e.g., the processor 270) may be configured to control receiving at least one piece of identification information identifying at least one of the external electronic device (e.g., the electronic device 101), at least part of information related to at least one processor of the external electronic device (e.g., the electronic device 101), and/or the first image processing scheme stored in the external electronic device (e.g., the electronic device 101), and as least part of the operation of generating the differential image information, the at least one processor (e.g., the processor 270) may be configured to generate the differential image information based on the difference between the first corrected image and the second corrected image, the first corrected image being generated in the first image processing scheme selected based on at least the at least one piece of identification information.

According to various embodiments, the at least one piece of identification information may be included in metadata of the raw image or configured independently of data of the raw image.

According to various embodiments, as at least part of the operation of generating the differential image information, the at least one processor (e.g., the processor 270) may be configured to generate an encoded image by encoding the second corrected image in a second encoding scheme requiring another frame image among HEVC encoding schemes, referring to the first corrected image, and as at least part of the operation of transmitting the differential image information to the external electronic device, the at least one processor (e.g., the processor 270) may be configured to control transmitting the encoded image to the external electronic device (e.g., the electronic device 101) through the communication module (e.g., the communication module 284).

Figure 3:
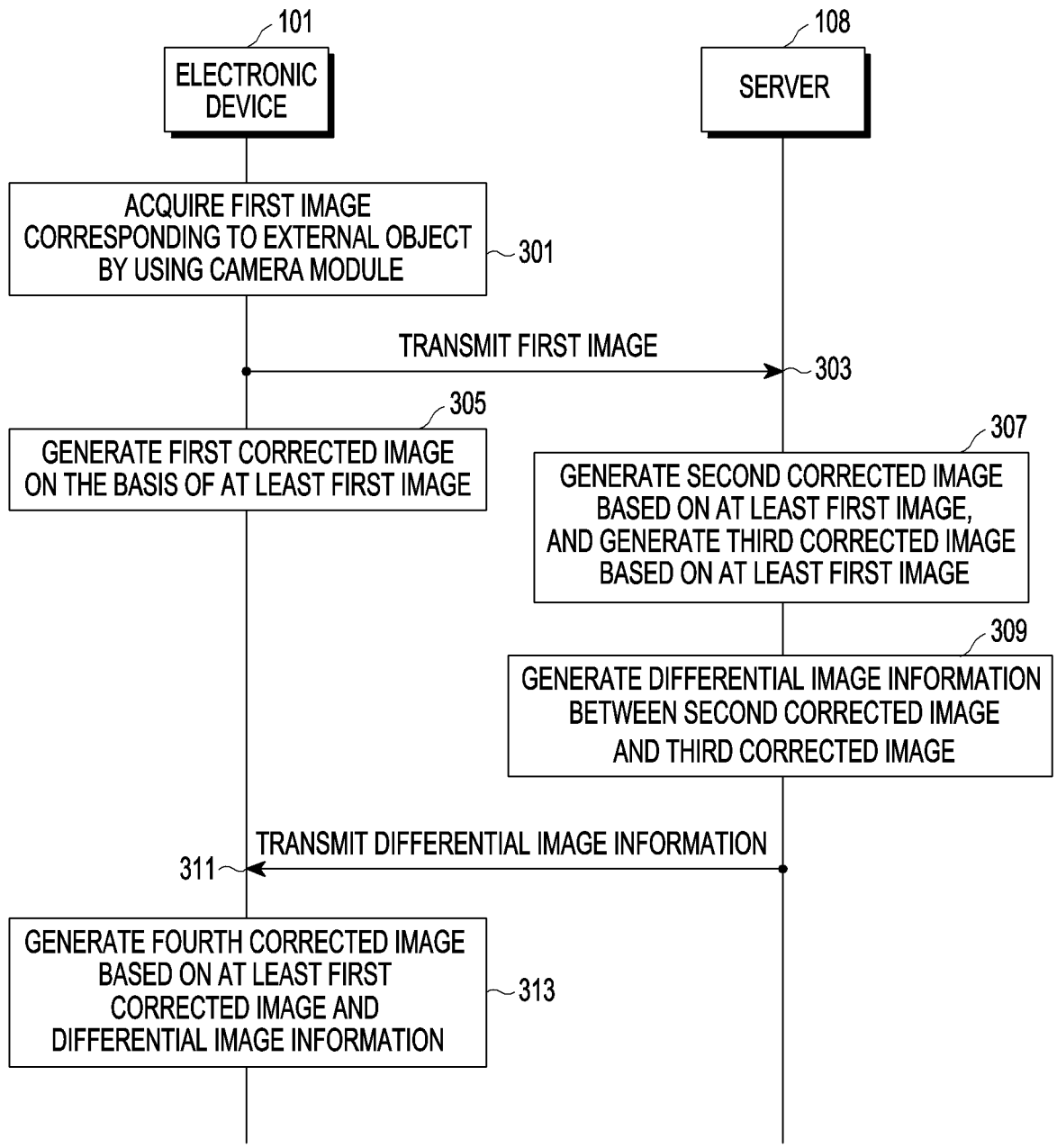
FIG. 3 is a flowchart illustrating a method for operating an electronic device and a server according to various embodiments.
Figure 4A:
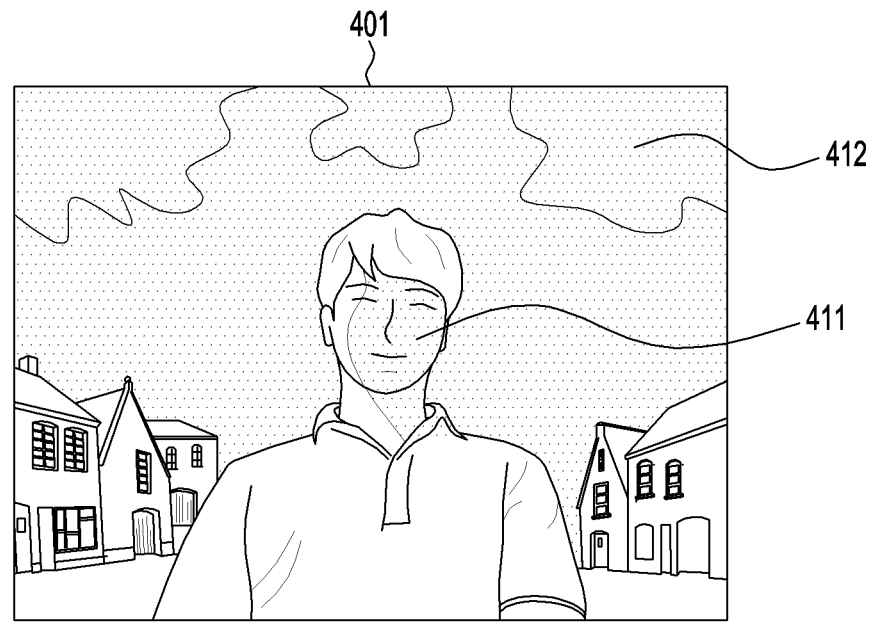
FIG. 4A is a view illustrating an image corrected by an electronic device or a server according to various embodiments.
Figure 4B:
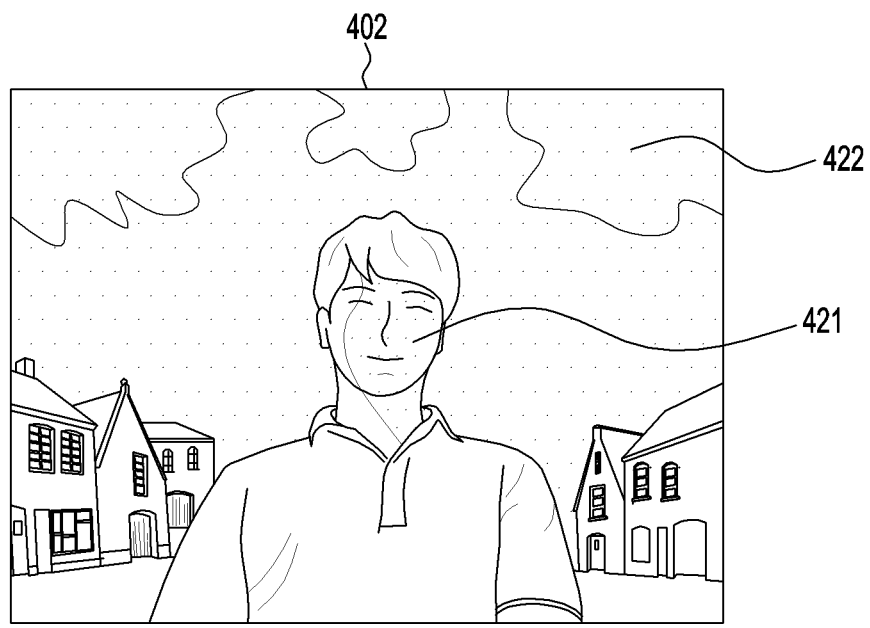
FIG. 4B is a view illustrating an image corrected by a server according to various embodiments.
Figure 4C:
FIG. 4C is a view illustrating a differential image according to various embodiments.

FIG. 3 is a flowchart illustrating a method for operating an electronic device and a server according to various embodiments. The embodiment illustrated in FIG. 3 will be described in greater detail with reference to FIGS. 4A, 4B and 4C. FIG. 4A illustrates an image corrected by an electronic device or a server according to various embodiments. FIG. 4B illustrates an image corrected by a server according to various embodiments. FIG. 4C illustrates a differential image according to various embodiments.

Referring to FIG. 3, according to various embodiments, the electronic device 101 (e.g., the processor 120) may acquire a first image corresponding to an external object, that is, a raw image of the external object, by using the camera module 180 in operation 301. In operation 303, the electronic device 101 may transmit the first image to the server 108. For example, the electronic device 101 may transmit the first image in the form of the raw image, or compress the first image and transmit the compressed first image to the server 108. In an example embodiment, once the electronic device 101 acquires the first image through the camera module 180, the electronic device 101 may be configured to transmit the first image in response to the acquisition. In another example embodiment, upon receipt of an additional input from a user, the electronic device 101 may be configured to transmit the first image in response to the receiving of the additional input. For example, the electronic device 101 may display the first image or an image obtained by correcting the first image on the display device 160, and additionally display a user interface on which additional correction through the server 108 may be selected. For example, the electronic device 101 may display an additional correction request object overlapped with at least part of an image displayed on the display device 160. Upon detection of selection of the additional correction request object, the electronic device 101 may transmit the first image to the server 108. For example and without limitation, the electronic device 101 may display, on the display device 160, information about the size of the first image, an expected upload time, an expected correction time, and/or a message notifying that a charge may be made. In another example embodiment, it may be determined whether to transmit the first image based on at least a communication connection state of the electronic device 101. For example, if the electronic device 101 is determined to be connected to a cellular network, the electronic device 101 may defer transmission of the first image, and then if the electronic device 101 is determined to be connected to a network conforming to a standard such as Wi-Fi or the like, the electronic device 101 may transmit the first image in response to the connection to the network. If the electronic device 101 supports a plurality of communication schemes, the electronic device 101 may determine whether to transmit the first image according to an activated communication scheme. While the transmission of the first image (operation 303) is shown in FIG. 3 as preceding generation of a first corrected image (operation 305), this is merely by way of example, not limitation. At the moment the foregoing various conditions are satisfied, the electronic device 101 may transmit the first image. For example, after the first corrected image is generated, the first image may be transmitted to the server 108.

According to various embodiments, the electronic device 101 (e.g., the ISP 260 of the electronic device 101) may generate the first corrected image based on at least the first image. For example, the electronic device 101 may generate the first corrected image by applying a first image processing scheme to the first image. The first image processing scheme may be set by the ISP 260 of the electronic device 101. The first image processing scheme set by the ISP 260 may include, but is not limited to, various processes such as white balancing, color adjustment, color filter array interpolation, NR/sharpening, and/or image enhancement. The first image processing scheme set by the ISP 260 may be fixed or updated. The first image processing scheme may include a plurality of image processes, and a process sequence may be set between the plurality of image processes. For example, the electronic device 101 may apply white balancing, color adjustment, and sharpening to the raw image in a predetermined order. In another example embodiment, a process sequence may not be set between the plurality of image processes.

According to various embodiments, the server 108 (e.g., the ISP 274 of the server 108) may generate a second corrected image based on at least the first image, and generate a third corrected image based on at least the first image at operation 307. The server 108 may generate the first corrected image by applying the first image processing scheme to the first image, and generate a third corrected image by applying a second image processing scheme different from the first image processing scheme to the first image. That is, since the server 108 generates the second corrected image by applying the same image processing scheme as the first image processing scheme to the first image, the second corrected image may be substantially identical to the first corrected image. According to various embodiments, the server 108 may determine the first image processing scheme of the electronic device 101. The server 108 may determine identification information (e.g., model information) about the electronic device 101, and determine the first image processing scheme corresponding to the identification information. For example, the server 108 may store model information about various electronic devices 101 and association information about image processing schemes corresponding to the model information. The server 108 may store, for example, association information listed in [Table 1].

TABLE 1

| Model information | Image processing scheme |
| --- | --- |
| abc model of company A | White balancing, noise reduction, sharpening, and/or image enhancement |
| bcd model of company A | noise reduction, sharpening, and/or image enhancement |
| bef model of company B | White balancing, noise reduction, sharpening, and/or image enhancement |

The server 108 may identify the first image processing scheme of the electronic device 101, referring to, for example, the association information of [Table 1]. In another example embodiment, the server 108 may store association information between model information and identification information about image processing algorithms (or image processing programs). In this case, the server 108 may check identification information about an image processing algorithm (or image processing program) corresponding to the model information about the electronic device 101, and apply the identified image processing scheme to the first image. If the first image processing scheme also defines a process order between a plurality of image processes, the server 108 may apply the identified image processes to the first image in the defined process order. For example, the server 108 may generate a second corrected image 401 illustrated in FIG. 4A by subjecting the first image to NR, sharpening, and/or image enhancement as the first image processing scheme. As described before, the electronic device 101 may also generate the corrected image 401 illustrated in FIG. 4A by applying the first image processing scheme to the first image.

According to various embodiments, the electronic device 101 may update an image processing program of the ISP 260. In this case, the server 108 may manage association information between the image processing scheme (or image processing program) and the unique identification information about the electronic device 101, instead of the model information about the electronic device 101. For example, if the server 108 has transmitted a file for updating the image processing program to the electronic device 101, the server 108 may store information related to the transmitted file in association with the file. Then, upon receipt of a first image from the electronic device 101, the server 108 may generate a second corrected image by applying the first image processing scheme, which is determined based on at least the identification information about the electronic device 101 and the stored association information, to the first image. If the server 108 receives an image from another electronic device (e.g., the electronic device 104), the server 108 may apply a third image processing scheme different from the first image processing scheme to the received first image.

According to various embodiments, the server 108 (e.g., the ISP 274 of the server 108) may generate a third corrected image by applying a second image processing scheme to the received first image. The second image processing scheme may be an image processing scheme set in the server 108, and an image process in which more accurate correction requiring a relatively high computation volume or relatively large resources may be performed. The second image processing scheme may be, for example, an image processing scheme which cannot be performed in the electronic device 101, and the server 108 may update the second image processing scheme to a latest image processing algorithm. Further, the second image processing scheme may use various pieces of correction area information acquired from the first image. For example, the server 108 may generate a third corrected image 402 illustrated in FIG. 4B by using correction area information indicating that the first image has scene classification information indicating an outdoor environment, a recognition result of a first area in the first image being a human face, and a recognition result of a second area in the first image being sky. The server 108 may apply an image processing effect corresponding to a face to a first area 421 of the third corrected image 402, and an image processing effect corresponding to the sky to a second area 422, as illustrated in FIG. 4B. It can be seen that the first area 421 in FIG. 4B is processed to be brighter than a first area 411 in FIG. 4A, and the second area 422 in FIG. 4B is processed to be brighter than a second area 412 in FIG. 4A. The server 108 may generate the third corrected image by an image processing scheme which does not use correction area information in addition to the image processing scheme based on the correction area information. Further, the server 108 may generate the third corrected image only by the image processing scheme which does not use correction area information. While the second image processing scheme may include at least a part of image processes included in the first image processing scheme, the second image processing scheme may be implemented with image processes different from those of the first image processing scheme in another example embodiment.

According to various embodiments, the server 108 may generate differential image information between the second corrected image and the third corrected image in operation 309. For example, the server 108 may calculate the difference between the pixel values of pixels in the second corrected image and the pixel values of corresponding pixels in the third corrected image, and generate a differential image based on at least the calculation result. For example, if the pixel value of a pixel in coordinates (i, j) in the second corrected image is $c_{(i,j)}$ and the pixel value of a pixel in coordinates (i, j) in the third corrected image is $d_{(i,j)}$, the server 108 may determine the pixel value of a pixel in coordinates (i, j) in the differential image to be $d_{(i,j)}-c_{(i,j)}$. If the second corrected image or the third corrected image is of size A×B, i may be a natural number equal to or larger than 1 and equal to or less than A, and j may be a natural number equal to or larger than 1 and equal to or less than B. The server 108 may generate a differential image by calculating the differences between at least parts of the pixels of the second and third corrected images. For example, FIG. 4C illustrates an example differential image 403. Because both the second corrected image 401 and the third corrected image 402 are corrected images for the raw image, the second corrected image 401 and the third corrected image 402 may have similar pixel values. Accordingly, as illustrated in FIG. 4C, most of the pixels of the differential image 403 may have values close to 0, which may be caused by a small difference between the second corrected image 401 and the third corrected image 402. Meanwhile, in another example embodiment, the server 108 may generate differential image information directly from the raw image without directly generating and storing the second corrected image and the third corrected image. For example, the server 108 may store a processing algorithm of directly generating differential image information corresponding to the difference between the second corrected image processed by the first image processing scheme and the third corrected image processed by the second image processing scheme. In this case, the server 108 may directly acquire the differential image information by applying the processing algorithm to the raw image.

According to various embodiments, the server 108 may transmit the differential image information to the electronic device 101 in operation 311. The server 108 may transmit the differential image directly to the electronic device 101, or may transmit the result of compressing the differential image to the electronic device 101. That is, the differential image information may be configured as the differential image or a file in which the differential image is compressed. In operation 313, the electronic device 101 may generate a fourth corrected image based on at least the first corrected image and the differential image information. For example, the electronic device 101 may add the differential image identified from the received differential image information to the first corrected image, thus producing the fourth corrected image. The pixel value of a pixel (i, j) in the differential image may be $d_{(i,j)}-c_{(i,j)}$, and since the pixel value of a pixel (i, j) in the first corrected image is $c_{(i,j)}$, the pixel value of a pixel (i, j) in the fourth corrected image generated by adding the first corrected image and the differential image may be $d_{(i,j)}$. The fourth corrected image may be substantially identical to the second corrected image. Therefore, even though the electronic device 101 does not support the second image processing scheme, the electronic device 101 may generate the fourth corrected image substantially identical to the second corrected image to which the second image processing scheme has been applied. In various embodiments, the process of generating the fourth corrected image in the electronic device 101 may be represented as a process of further correcting the first corrected image.

Meanwhile, if the communication module 190 is turned off, the electronic devices 101 may not receive the differential image information, and thus may generate the first corrected image. If the communication module 190 is turned on, the electronic device 101 may receive the differential image information, and thus generate the fourth corrected image by adding the differential image to the first corrected image. Accordingly, the electronic device 101 may generate a different image depending on whether the communication module 190 is turned on or off. The first corrected image may be different from the raw image acquired by the electronic device 101, and the second corrected image may also be different from the raw image. Further, the difference between the first corrected image generated in the case in which the communication module 190 is turned off and the fourth corrected image generated in the case in which the communication module 190 is turned on may correspond to information (i.e., the differential image information) included in a communication signal that the electronic device 101 receives from the server 108. For example, information acquired by decompressing the information included in the communication signal may be identical to the difference between the corrected image generated when the communication module 190 is turned on and the corrected image generated when the communication module 190 is turned off.

Figure 5:
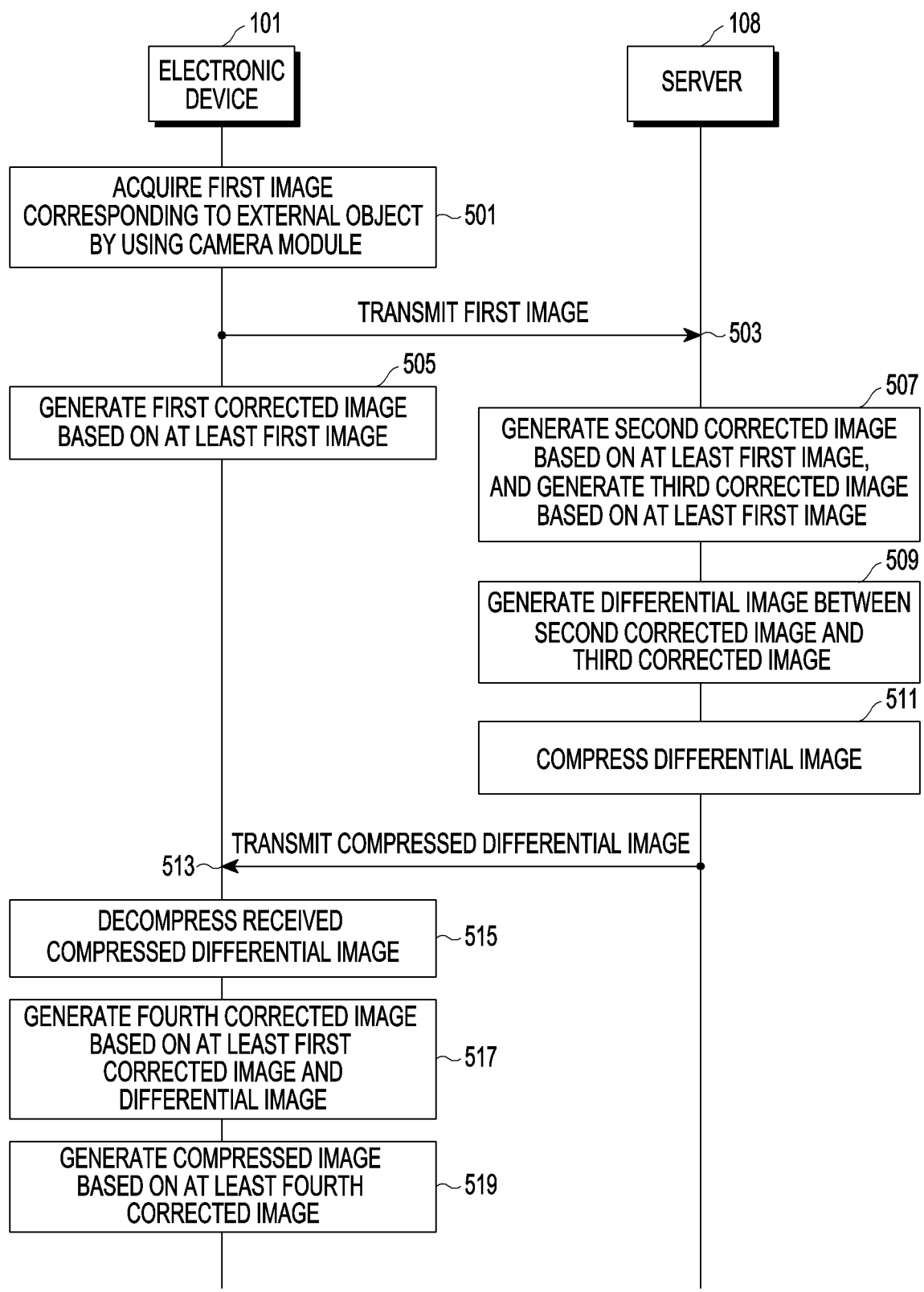
FIG. 5 is a flowchart illustrating a method for operating an electronic device and a server according to various embodiments.
Figure 6:
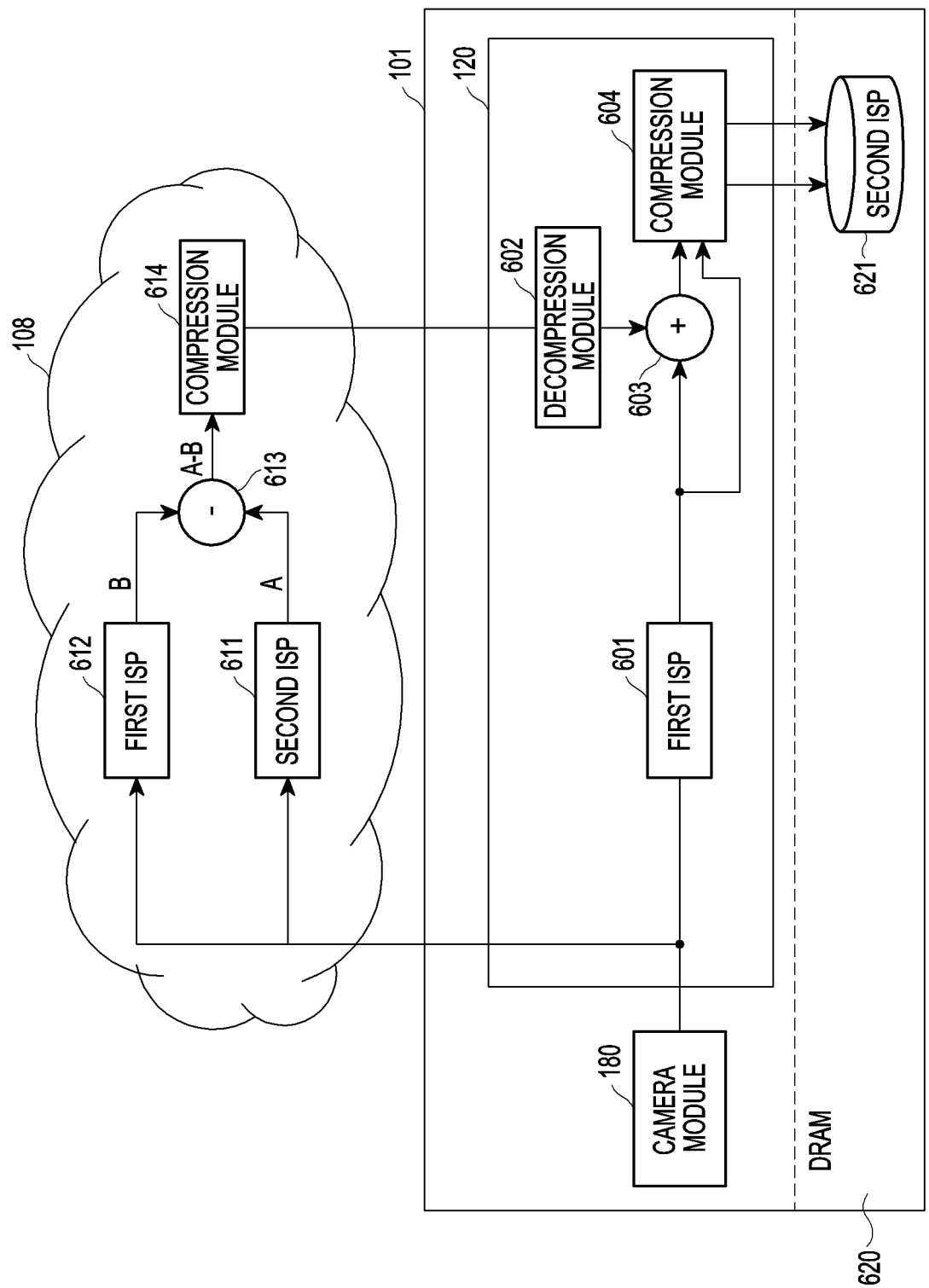
FIG. 6 is a block diagram illustrating an electronic device and a server according to various embodiments.

FIG. 5 is a flowchart illustrating a method for operating an electronic device and a server according to various embodiments. The embodiment of FIG. 5 will further be described with reference to FIG. 6. FIG. 6 is a block diagram illustrating an electronic device and a server according to various embodiments According to various embodiments, the electronic device 101 may acquire a first image corresponding to an external object by using the camera module 180 in operation 501. In operation 503, the electronic device 101 may transmit the first image to the server 108. For example, as illustrated in FIG. 6, the first image, that is, a raw image may be output from the camera module 180 of the electronic device 101, and the electronic device 101 may output the first image to a first ISP 601 of the electronic device 101 and transmit the first image to the server 108. In operation 505, the electronic device 101 (e.g., the first ISP 601) may generate a first corrected image based on at least the first image. The first ISP 601 may generate the first corrected image by applying a first image processing scheme to the first image.

According to various embodiments, the server 108 may generate a second corrected image (e.g., B in FIG. 6) based on at least the first image, and generate a third corrected image (e.g., A in FIG. 6) based on at least the first image in operation 507. For example, the server 108 may configure, in the form of a simulator, a first ISP 612 of the same model as the first ISP 601 of the electronic device 101, and thus generate the second corrected image (e.g., B in FIG. 6) substantially identical to the first corrected image generated by the first ISP 601 of the electronic device 101.

In operation 509, the server 108 may generate a differential image between the second corrected image and the third corrected image. For example, as illustrated in FIG. 6, the server 108 may subtract the second corrected image (e.g., B in FIG. 6) from the third corrected image (e.g., A in FIG. 6), as indicated by reference numeral 613, thus generating the differential image (e.g., A-B in FIG. 6). In operation 511, the server 108 may compress the differential image. The server 108 (e.g., a compression module 614) may compress the differential image by using, but not limited to, various compression schemes. As illustrated in FIG. 4C, most of the pixels of the differential image have values close to 0, and the differences between pixels are also relatively small. This is because the first ISP 612 is likely to apply a first correction effect to the entire pixels of the raw image, and the second ISP 611 is likely to apply a second correction effect to the whole pixels of the raw image. In this case, the whole pixels of the differential image are likely to have a value corresponding to the difference between the second correction effect and the first correction effect, and thus may have relatively uniform values. In various embodiments, the server 108 may perform compression by using a lossless compression scheme, for example, a compression scheme having a high compression rate for an image having relatively uniform pixel values (e.g., a run-length encoding scheme). In operation 513, the server 108 may transmit the compressed differential image. Since the compressed differential image has a reduced size due to the compression, the compressed differential image may be transmitted to the electronic device 101 in a relatively short time.

According to various embodiments, the electronic device 101 (e.g., a decompression module 602 in FIG. 6) may decompress the received compressed differential image in operation 515. In operation 517, the electronic device 101 may generate a fourth corrected image based on at least the first corrected image and the differential image. As described before, the fourth corrected image may be substantially identical to the third corrected image. For example, the electronic device 101 may generate the fourth corrected image by adding the first corrected image and the differential image, as indicated by reference numeral 603. In operation 519, the electronic device 101 (e.g., the compression module 604 in FIG. 6) may generate a compressed image based on at least the fourth corrected image. For example, the compression module 604 may perform compression in a scheme defined in JPEG, and those skilled in the art will readily appreciate that the disclosure is not limited to any specific compression scheme. The electronic device 101 may store the compressed image in a memory (e.g., a storage 621 of a DRAM 620). The disclosure is not limited to the above compression scheme and decompression scheme. For example, various lossless compression schemes are available.

Figure 7A:
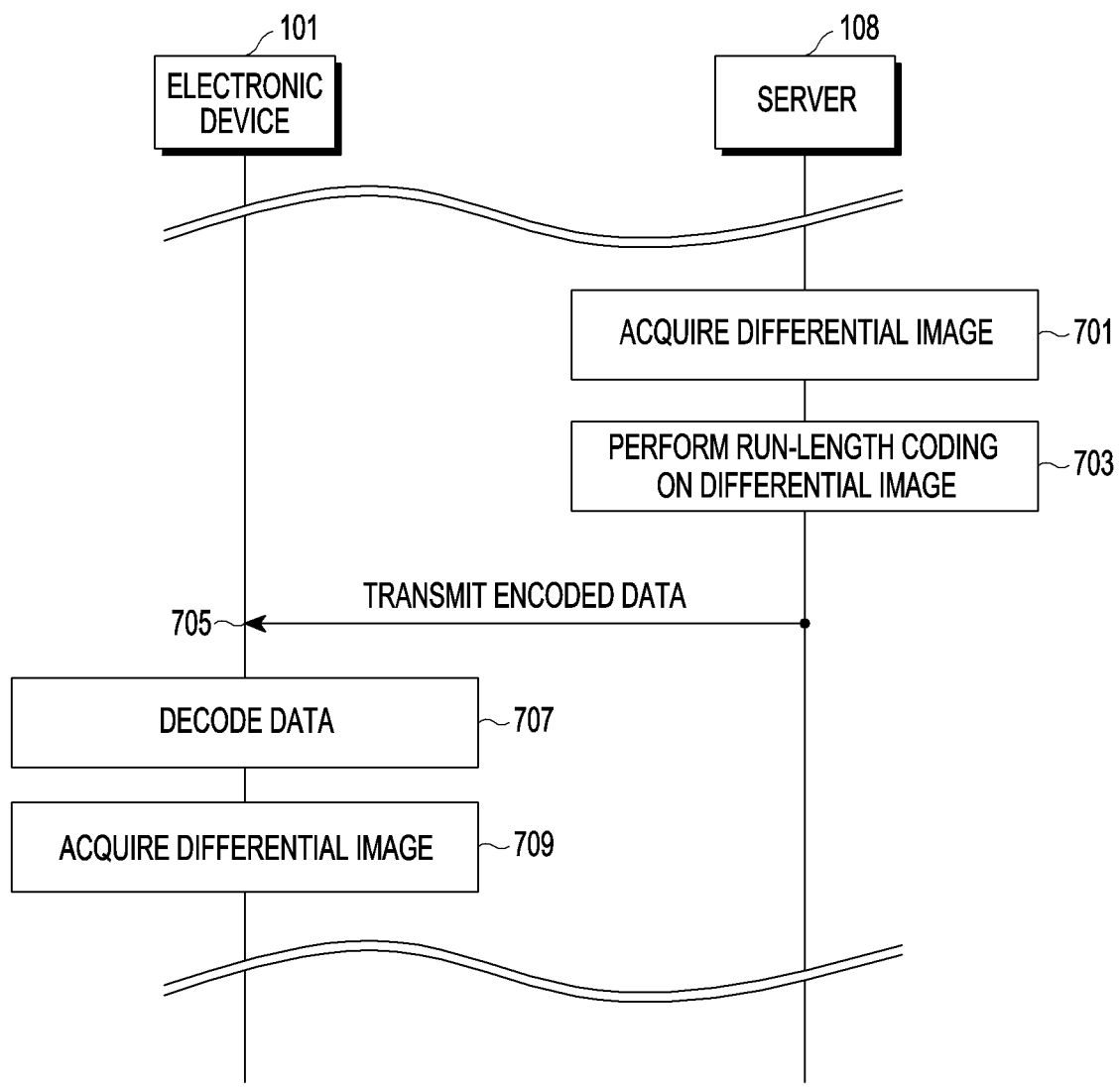
FIG. 7A is a flowchart illustrating run-length encoding according to various embodiments.

FIG. 7A is a flowchart illustrating run-length encoding according to various embodiments.

According to various embodiments, the server 108 may acquire a differential image in operation 701. In operation 703, the server 108 may perform run-length encoding on the differential image. For example, if adjacent pixels have the same value (or the difference between the pixel values of the adjacent pixels is less than a threshold), the server 108 may generate encoding data for the differential image by using information indicating the number of contiguous pixels having the same value as a corresponding pixel value. As described above, the differential image is highly likely to have relatively uniform values across the whole pixels of the differential image. Accordingly, if the differential image is encoded by run-length encoding, the encoded data of the differential image may be smaller in size than the original data. In operation 705, the server 108 may transmit the encoded data to the electronic device 101. The electronic device 101 may decode the received encoded data, for example, by applying a run-length decoding algorithm to the received data in operation 707. The electronic device 101 may acquire a differential image as a result of the decoding in operation 709. The electronic device 101 may generate an image substantially identical to an image corrected by the server 108, based on at least the acquired differential image and a corrected image generated autonomously by the electronic device 101.

Figure 7B:
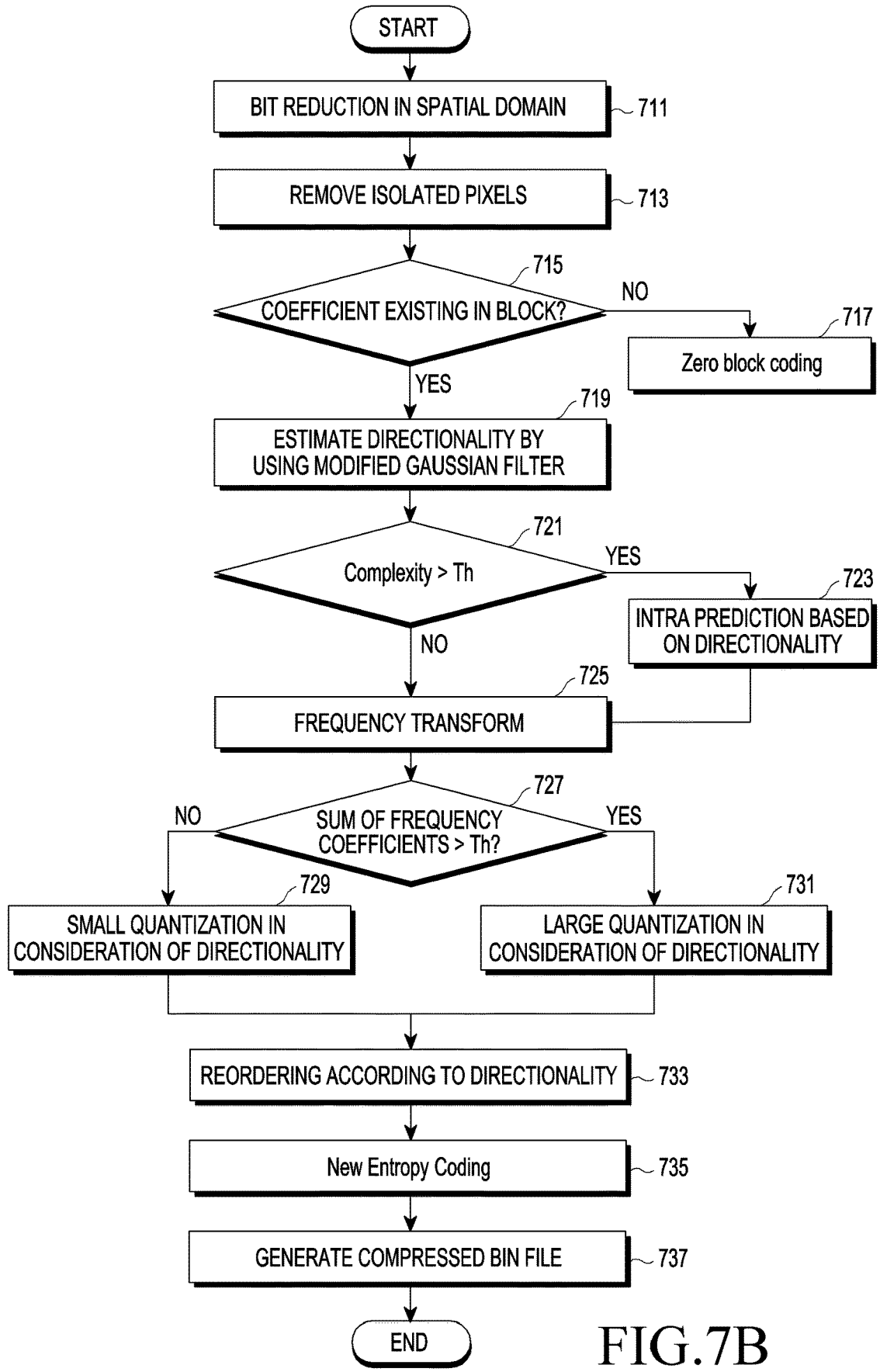
FIG. 7B is a flowchart illustrating a compression process according to various embodiments.

FIG. 7B is a flowchart illustrating a method for compressing an image according to various embodiments.

According to various embodiments, the server 108 may perform bit reduction in the spatial domain of an image (e.g., a differential image) in operation 711. In operation 713, the server 108 may remove isolated pixels of the image. In operation 715, the server 108 may determine whether there is a coefficient in a block of the image. If a coefficient is determined to not exist within the block, the server 108 may perform zero-block coding on the block in operation 717. If a coefficient is determined to exist in the block, the server 108 may estimate a directionality by using a modified Gaussian filter in operation 719. The server 108 may determine whether complexity exceeds a threshold complexity in operation 721. If the complexity is determined to exceed the threshold complexity, the server 108 may perform, for example, intra prediction based on the estimated directionality in operation 723. In operation 725, the server 108 may perform frequency transform. If the complexity is determined to be equal to or less than the threshold complexity, the server 108 may perform frequency transform in operation 725 without performing intra prediction. In operation 727, the server 108 may determine whether the sum of frequency coefficients exceeds a threshold coefficient. If the sum of frequency coefficients is determined to exceed the threshold coefficient, the server 108 may perform large quantization in consideration of the directionality in operation 731, and if the sum of frequency coefficients is determined to be equal to or less than the threshold coefficient, the server 108 may perform small quantization in consideration of the directionality, in operation 729. In operation 733, the server 108 may perform reordering according to the directionality. In operation 735, the server 108 may perform a new entropy coding. In operation 737, the server 108 may generate a compressed bin file. According to an example embodiment, in addition to the methods illustrated in FIGS. 7A and 7B, various other compression schemes (e.g., a lossless compression scheme) are available, and the disclosure is not limited to any specific compression scheme.

Figure 8A:
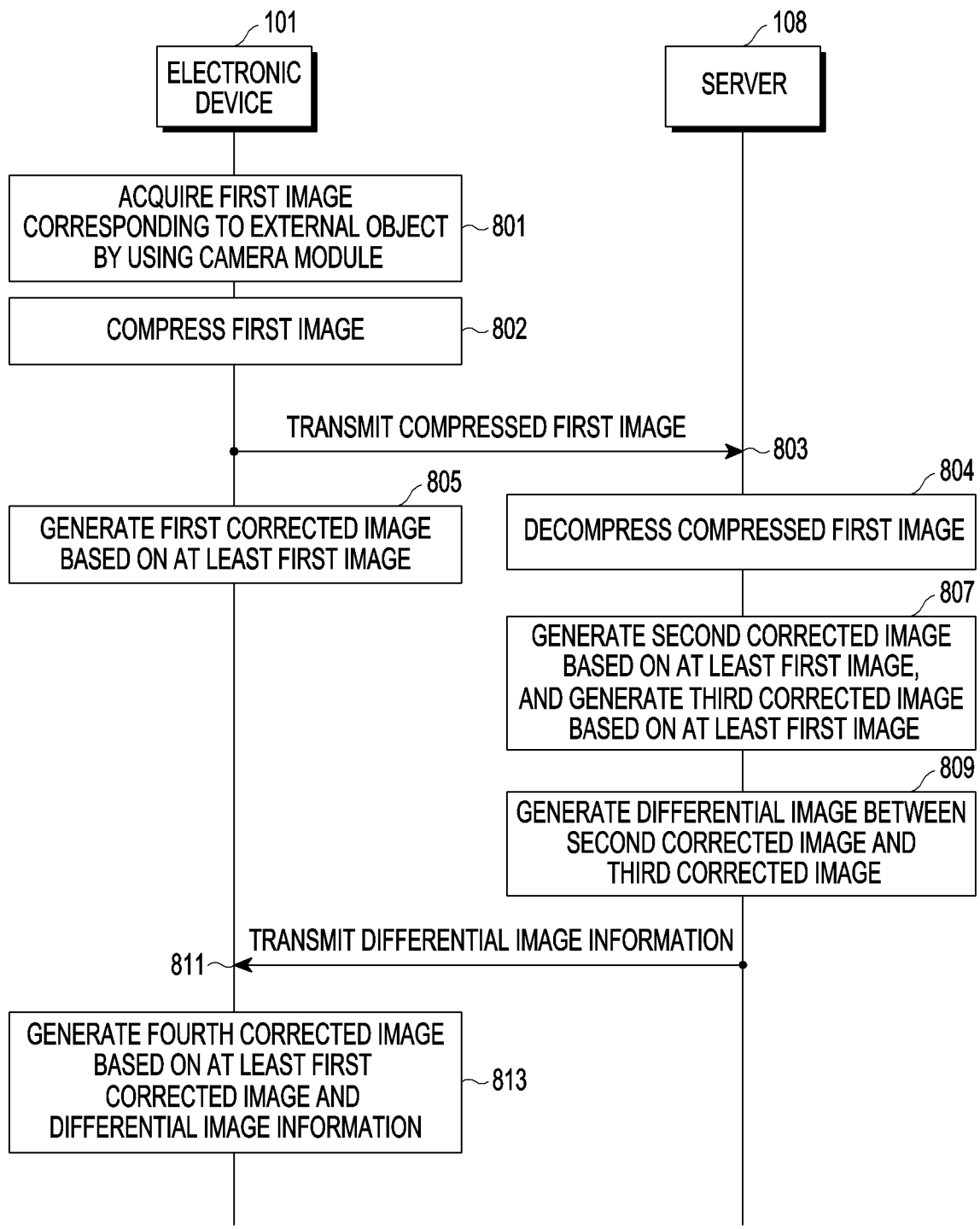
FIGS. 8A and 8B are flowcharts illustrating methods for operating an electronic device and a server according to various embodiments.

FIG. 8A is a flowchart illustrating a method for operating an electronic device and a server according to various embodiments.

Referring to FIG. 8A, according to various embodiments, the electronic device 101 may acquire a first image corresponding to an external object by using the camera module 180 in operation 801. In operation 802, the electronic device 101 may compress the first image, that is, a raw image. The electronic device 101 may compress the first image using various compression schemes, thus reducing the size of the raw image. In operation 803, the electronic device 101 may transmit the compressed first image to the server 108.

According to various embodiments, the server 108 may decompress the compressed first image in operation 804. The server 108 may identify a compression scheme from the compressed image, and decompress the compressed first image based on the identified compression scheme. The server 108 may include various types of compression/decompression modules, and thus decompress images compressed in various compression schemes, received from various electronic devices 101. For example, the server 108 may receive a compressed image from another electronic device (e.g., the electronic device 104). Then, the server 108 may decompress the compressed image by using a decompression module other than the decompression module corresponding to the electronic device 101. In operation 805, the electronic device 101 may generate a first corrected image based on at least the first image. The electronic device 101 may generate the first corrected image by applying a first image processing scheme to the first image. In operation 807, the server 108 may generate a second corrected image based on at least the first image, and generate a third corrected image based on at least the first image. The server 108 may generate the second corrected image by applying the first image processing scheme to the first image, and generate the third corrected image by applying a second image processing scheme to the first image. In operation 809, the server 108 may generate a differential image between the second corrected image and the third corrected image. In operation 811, the server 108 may transmit differential image information to the electronic device 101. In operation 813, the electronic device 101 may generate a fourth corrected image based on at least the first corrected image and the differential image information. As described before, the fourth corrected image may be substantially identical to the third corrected image.

Figure 8B:
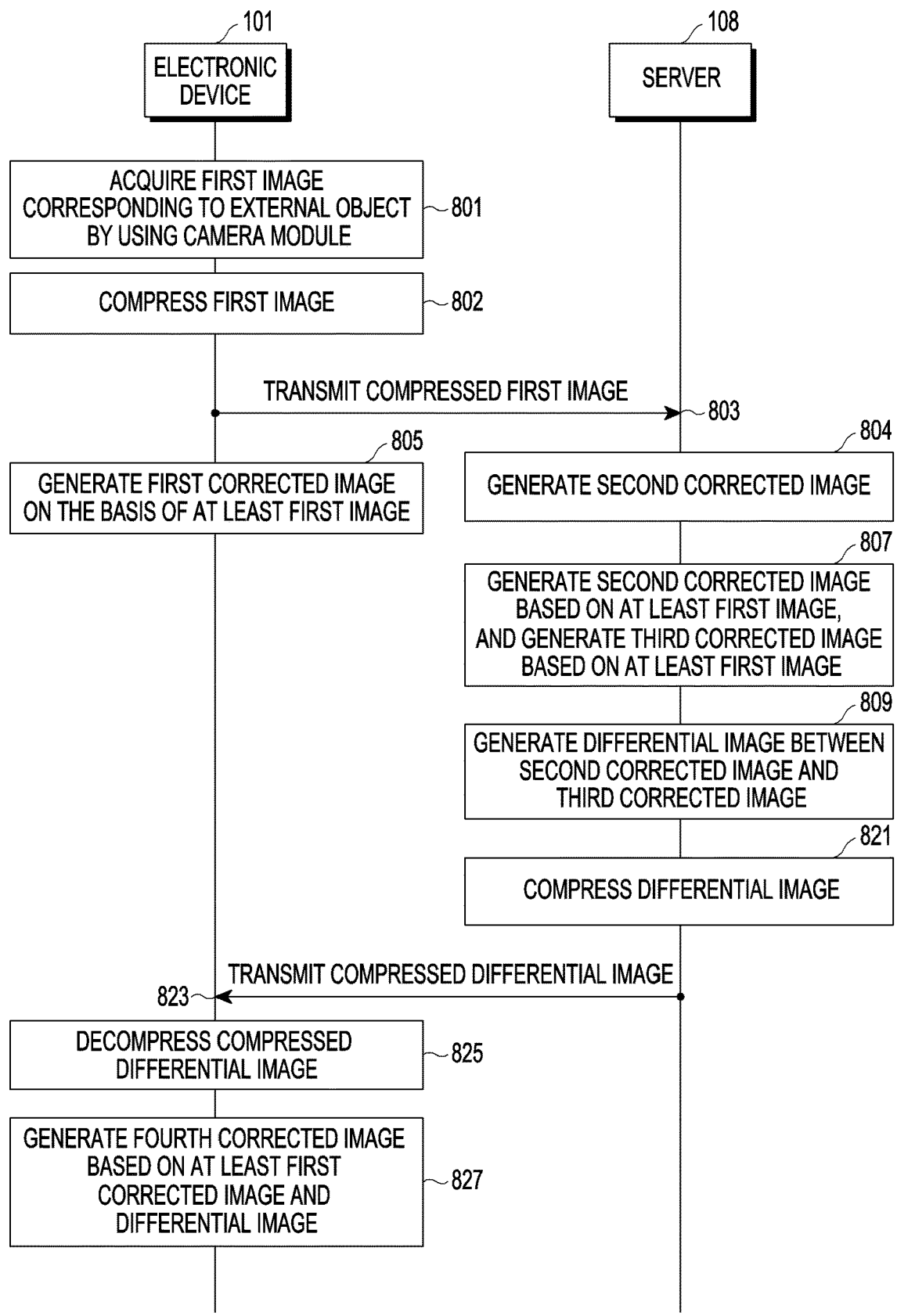

FIG. 8B is a flowchart illustrating a method for operating an electronic device and a server according to various embodiments.

Operations 801 to 809 have been described before with reference to FIG. 8A, and thus will not be described in detail herein.

In operation 821, the server 108 may compress the differential image generated at operation 809. For example, the server 108 may compress differential image information by using a run-length encoding scheme, as described above. According to various embodiments, the server 108 may include a plurality of compression modules, and the server 108 may select a compression scheme for compression. The server 108 may select the compression scheme by using identification information about the electronic device 101. Further, the server 108 may select the compression scheme based on at least the compression scheme used by the electronic device 101, identified from the compressed first image received from the electronic device 101 in operation 803. The compression scheme performed by the electronic device 101 in operation 802 may be identical to or different from the compression scheme performed by the server 108 in operation 821. In operation 823, the server 108 may transmit the compressed differential image to the electronic device 101. In operation 825, the electronic device 101 may decompress the compressed differential image. The electronic device 101 may identify the compression scheme based on at least the data received in operation 823, and perform decompression based on at least the identified compression scheme. Further, the electronic device 101 may perform decompression based on at least the compression scheme performed in operation 802. In operation 827, the electronic device 101 may generate a fourth corrected image based on at least the first corrected image and the differential image.

Figure 9:
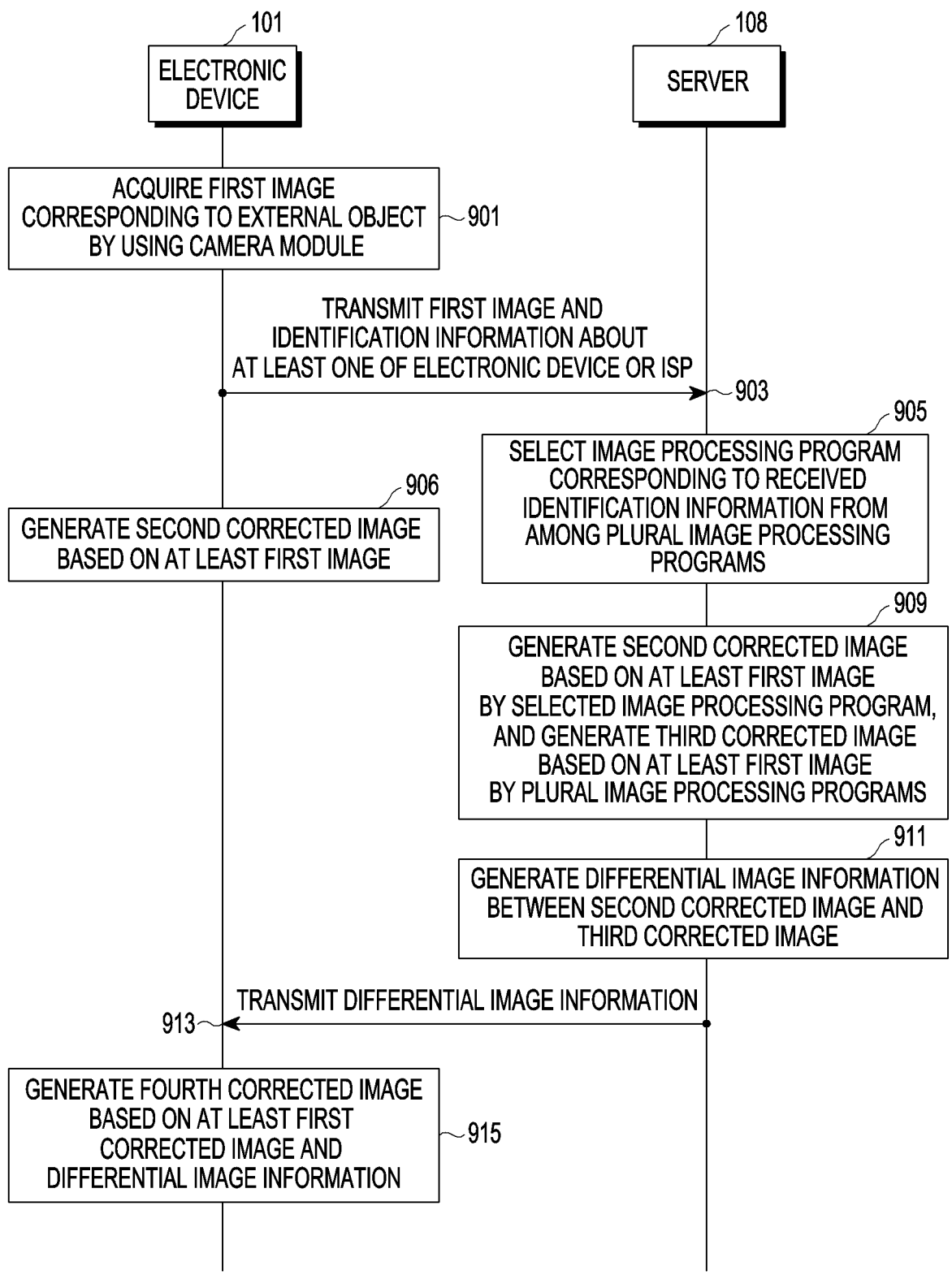
FIG. 9 is a flowchart illustrating a method for operating an electronic device and a server according to various embodiments.
Figure 10:
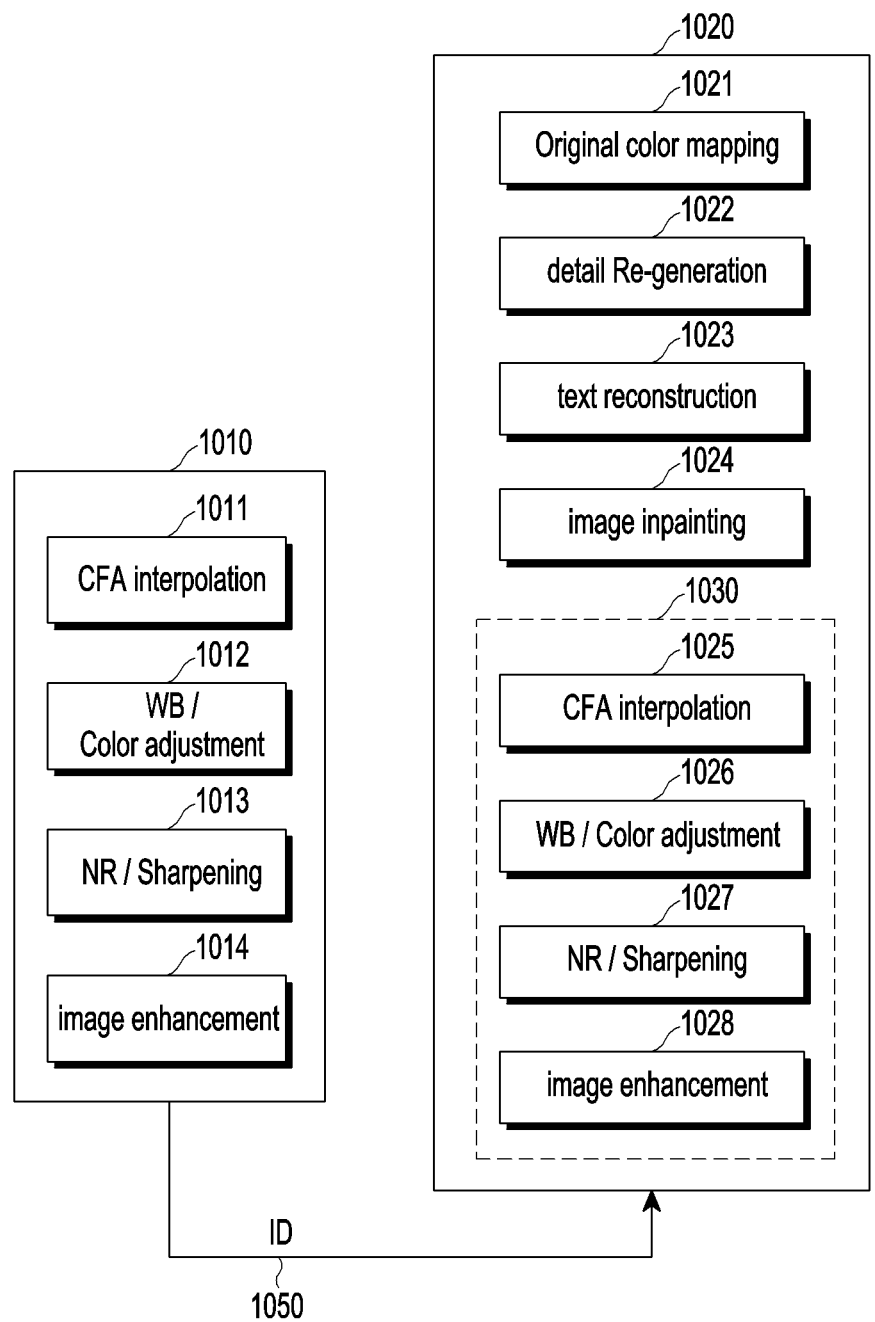
FIG. 10 is a view illustrating an image processing program in an electronic device and a server according to various embodiments.

FIG. 9 is a flowchart illustrating a method for operating an electronic device and a server according to various embodiments. The embodiment of FIG. 9 will be described in greater detail with reference to FIG. 10. FIG. 10 is a view illustrating an image processing program in an electronic device and a server according to various embodiments.

According to various embodiments, the electronic device 101 may acquire a first image corresponding to an external object, that is, a raw image of the external object by using the camera module in operation 901. In operation 903, the electronic device 101 may transmit the first image and identification information about at least one of the electronic device 101 or the ISP 260 of the electronic device 101. The identification information about the ISP 260 may include, for example, information identifying the ISP 260 or information representing at least one image processing program used by the ISP 260. The electronic device 101 may transmit the first image and the identification information separately in different communication signals or in one communication signal.

According to various embodiments, the server 108 may select a processing program corresponding to the received identification information from among a plurality of image processing programs in operation 905. For example, as illustrated in FIG. 10, the electronic device 101 (e.g., the ISP 260) may perform a first image processing scheme 1010, and the first image processing scheme 1010 may include the image processing programs of CFA interpolation 1011, white balancing (WB)/color adjustment 1012, noise reduction (NR)/sharpening 1013, and image enhancement 1014. The server 108 may store, for example, a plurality of image processing programs 1020. The plurality of image processing programs 1020 may include original color mapping 1021, detail re-generation 1022, text reconstruction 1023, image inpainting 1024, CFA interpolation 1025, WB/color adjustment 1026, NR/sharpening 1027, and image enhancement 1028. The electronic device 101 may transmit identification information 1050 identifying the first image processing scheme 1010 to the server 108. The server 108 may select a part 1030 of the plurality of image processing programs 1020 based on the received identification information 1050. The server 108 may select the part 1030 of the plurality of image processing programs 1020 in order to perform the same image processes as in the first image processing scheme performed by the electronic device 101.

In operation 906, the electronic device 101 may generate a first corrected image based on at least the first image. The electronic device 101 may generate the first corrected image by applying, for example, the image processing programs 1011, 1012, 1013, and 1014 included in the first image processing scheme 1010 illustrated in FIG. 10 to the first image. In operation 909, the server 108 may generate a second corrected image based on at least the first image by a selected processing program, and generate a third corrected image by a plurality of image processing programs based on at least the first image. For example, as illustrated in FIG. 10, the server 108 may generate the second corrected image by applying an image processing program 1030 selected in correspondence with the electronic device 101 from among the plurality of image processing programs 1020. The server 108 may generate the third corrected image by applying, for example, at least a part of the plurality of image processing programs 1020 illustrated in FIG. 10. The server 108 may generate the third corrected image by applying all of the plurality of stored image processing programs 1020 to the first image, or applying a part of the plurality of stored image processing programs 1020 to the first image. The server 108 may determine correction area information, for example, from the first image, and generate the third corrected image by applying at least a part of the plurality of image processing programs 1020 to the first image based on the correction area information. For example, the server 108 may strongly apply sharpening and detail enhancement to an area corresponding to the hairs of a human, and strongly apply noise reduction to an area corresponding to the face of the human. For example, the server 108 may generate a feature vector corresponding to classification information, map the original color of an object, and regenerate the details of the object. For example, the server 108 may perform text reconstruction through text recognition, and perform image inpainting to fill an erased part of the recognized object. In operation 911, the server 108 may generate differential image information between the second corrected image and the third corrected image. The server 108 may transmit the differential image information to the electronic device 101 in operation 913. In operation 915, the electronic device 101 may generate a fourth corrected image substantially identical to the third corrected image based on at least the first corrected image and the differential image information.

Figure 11:
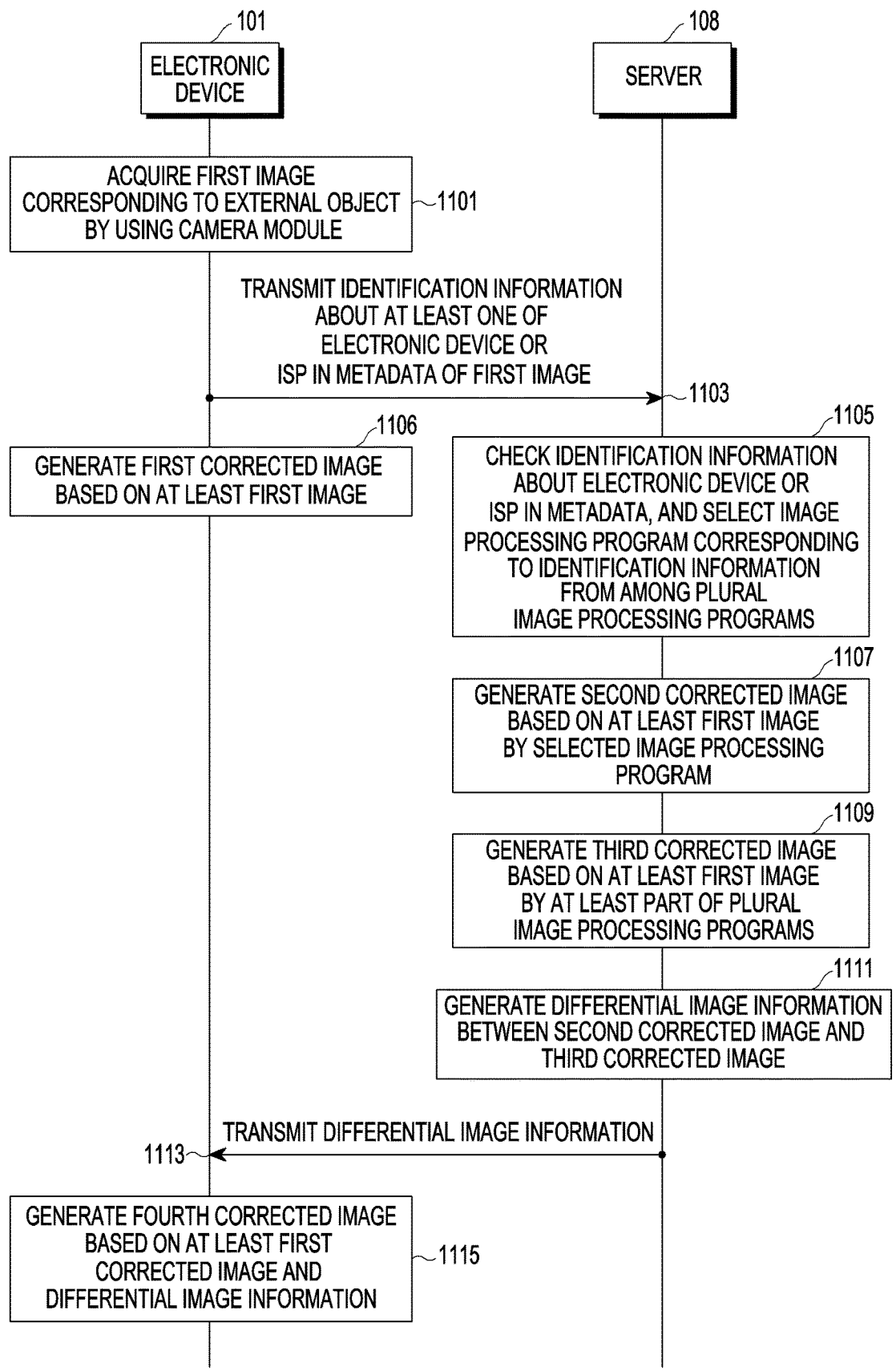
FIG. 11 is a flowchart illustrating a method for operating an electronic device and a server according to various embodiments.

FIG. 11 is a flowchart illustrating a method for operating an electronic device and a server according to various embodiments.

According to various embodiments, the electronic device 101 may acquire a first image corresponding to an external object, that is, a raw image of the external object by using the camera module 180 in operation 1101. In operation 1103, the electronic device 101 may transmit identification information about at least one of the electronic device or the ISP in metadata of the first image. According to various embodiments, the electronic device 101 may include information to be used in simulating the ISP in the server 108, in the metadata of the first image, that is, the raw image.

In operation 1105, the server 108 may check the identification information about the electronic device 101 or the ISP 260 in the metadata of the first image, and select an image processing program corresponding to the identification information, from among a plurality of image processing programs. In operation 1106, the electronic device 101 may generate a first corrected image based on at least the first image. In operation 1107, the server 108 may generate a second corrected image based on at least the first image by using the selected processing program. The second corrected image may be substantially identical to the first corrected image. In operation 1109, the server 108 may generate a third corrected image based on at least the first image by at least a part of the plurality of image processing programs. In operation 1111, the server 108 may generate differential image information between the second corrected image and the third corrected image. In operation 1113, the server 108 may transmit the differential image information to the electronic device 101. In operation 1115, the electronic device 101 may generate a fourth corrected image substantially identical to the third corrected image based on at least the first corrected image and the differential image information.

Figure 12:
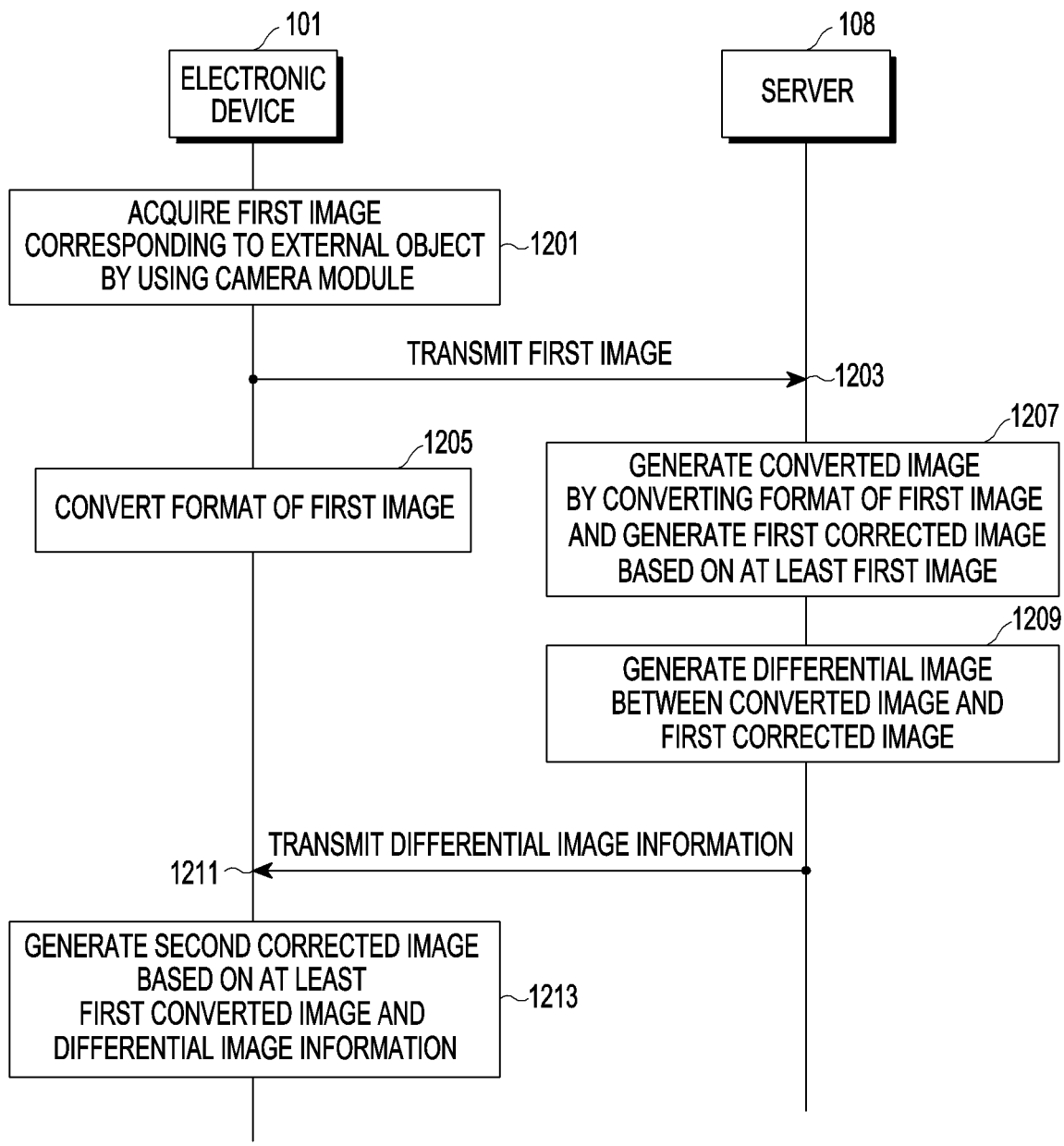
FIG. 12 is a flowchart illustrating a method for operating an electronic device and a server according to various embodiments.
Figure 13:
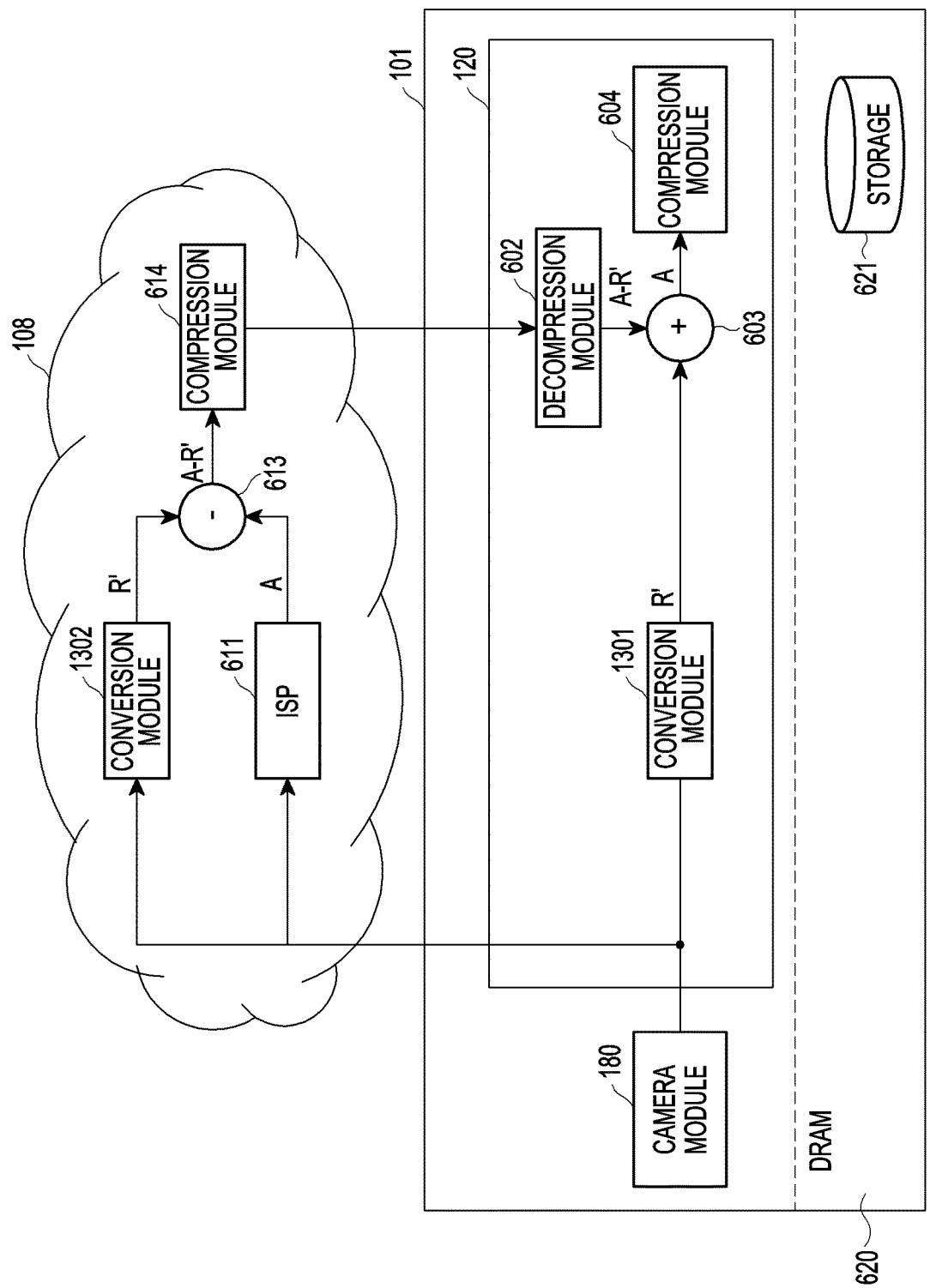
FIG. 13 is a block diagram illustrating an electronic device without an image signal processor (ISP), and a server according to various embodiments.

FIG. 12 is a flowchart illustrating a method for operating an electronic device and a server according to various embodiments. The embodiment of FIG. 12 will be described in greater detail with reference to FIG. 13. FIG. 13 is a block diagram illustrating an electronic device without an ISP, and a server according to various embodiments.

According to various embodiments, the electronic device 101 may acquire a first image corresponding to an external object, that is, a raw image, of the external object by using the camera module 180 in operation 1201. For example, as illustrated in FIG. 13, the processor 120 of the electronic device 101 may include the decompression module 602, the compression module 604, and/or a conversion module 1301. According to various embodiments, the electronic device 101 may not include an ISP which executes an image processing program. In operation 1203, the electronic device 101 may transmit the first image to the server 108.

According to various embodiments, the electronic device 101 may convert the format of the first image in operation 1205. For example, the electronic device 101 may convert the format of the raw image to a format of a corrected image, YUV format. The electronic device 101 may only convert the format of the raw image to the format of the correction file without performing an image process for correction. This may be intended to unify the formats of images in a later summation process. For example, as illustrated in FIG. 13, the conversion module 1301 may generate an image R' obtained by converting the format of the first image, being the raw image. In operation 1207, the server 108 may generate a converted image by converting the format of the received first image and generate a first corrected image based on at least the first image. For example, as illustrated in FIG. 13, the server 108 may include a conversion module 1302 identical to the conversion module 1301 of the electronic device 101, and the conversion module 1302 may generate the converted image R' by converting the format of the received first image. The ISP 611 of the server 108 may generate the first corrected image A. In operation 1209, the electronic device 101 may generate a differential image between the converted image and the first corrected image. For example, as illustrated in FIG. 13, the server 108 may subtract the converted image R' from the first corrected image A as indicated by reference numeral 613, thereby generating the differential image A-R'. In operation 1211, the server 108 may transmit differential image information to the electronic device 101. For example, as illustrated in FIG. 13, the server 108 may compress the differential image A-R' by using the compression module 614 and transmit the compressed differential image, that is, the differential image information to the electronic device 101. In operation 1213, the electronic device 101 may generate a second corrected image based on at least the converted image and the differential image information. For example, the electronic device 101 may decompress the received compressed differential image by using the decompression module 602, thereby acquiring the differential image A-R'. The electronic device 101 may sum the converted image R' and the differential image A-R' as indicated by reference numeral 603, thereby generating a second corrected image. The second corrected image may be substantially identical to the first corrected image. For example, if the pixel value of pixel (i, j) in the converted image R' is $R'_{(i,j)}$ and the pixel value of pixel (i, j) in the first corrected image A is $d_{(i,j)}$, the pixel value of pixel (i, j) in the differential image may be $d_{(i,j)} - R'_{(i,j)}$. Then, the pixel value of pixel (i, j) in the second corrected image generated by the summation module 603 may be $d_{(i,j)} (= R'_{(i,j)} + (d_{(i,j)} - R'_{(i,j)}))$. Therefore, the second corrected image may be substantially identical to the first corrected image. The electronic device 101 may compress the second corrected image in a JPEG format through, for example, the compression module 604, and store the compressed second corrected image in a memory (e.g., the storage 621 of the DRAM 620). As described above, even though the electronic device 101 according to various embodiments includes only the conversion module 1301 capable of simply converting a format without including an ISP, the electronic device 101 may acquire the same corrected image as processed in the server 108.

Figure 14:
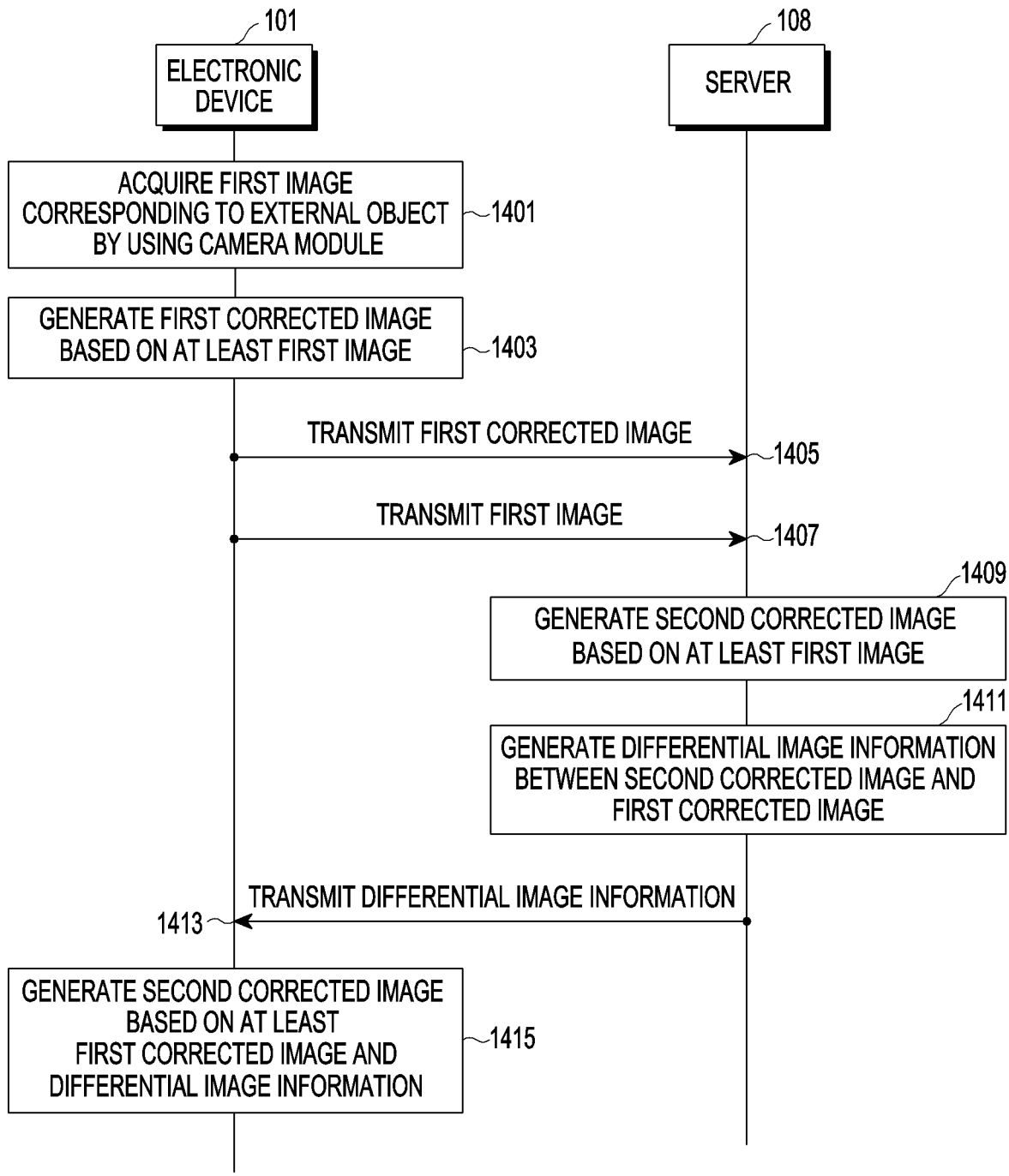
FIG. 14 is a flowchart illustrating a method for operating an electronic device and a server according to various embodiments.
Figure 15:
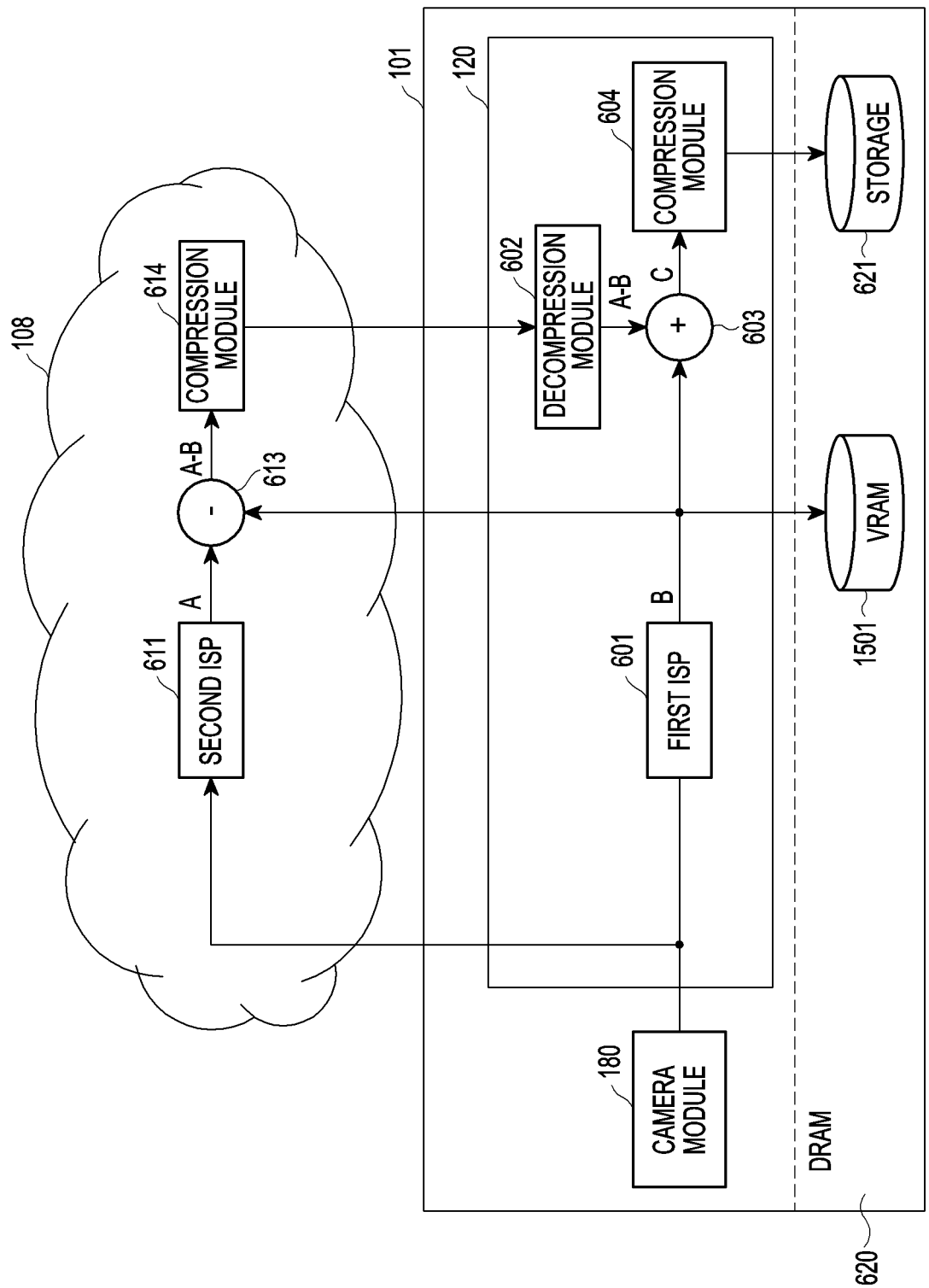
FIG. 15 is a block diagram illustrating an electronic device and a server according to various embodiments.

FIG. 14 is a flowchart illustrating a method for operating an electronic device and a server according to various embodiments. The embodiment of FIG. 14 will be described in greater detail with reference to FIG. 15. FIG. 15 is a block diagram illustrating an electronic device and a server according to various embodiments.

According to various embodiments, the electronic device 101 may acquire a first image corresponding to an external object, that is, a raw image of the external object, by using the camera module 180 in operation 1401. In operation 1403, the electronic device 101 may generate a first corrected image based on at least the first image. In operation 1405, the electronic device 101 may transmit the first corrected image. In operation 1407, the electronic device 101 may transmit the first image. The sequence of transmitting the first corrected image and the first image is not limited. For example, the transmission of the first image to the server 108 may precede the transmission of the first corrected image to the server 108. For example, as illustrated in FIG. 15, the first ISP 601 of the electronic device 101 may generate a first corrected image B by applying a first image processing scheme to the first image. The electronic device 101 may transmit the first corrected image B to the server 108 through the communication module 190. The electronic device 101 may transmit the first image acquired from the camera module 180 to the server 108, for example, through the communication module 190. The first corrected image B may be stored temporarily or non-transitorily in a video RAM (VRAM) 1501, and displayed as a preview image on the display.

According to various embodiments, the server 108 may generate a second corrected image based on the at least the first image in operation 1409. In operation 1411, the server 108 may generate a differential image between the second corrected image and the first corrected image. For example, as illustrated in FIG. 15, the second ISP 611 of the server 108 may generate a second corrected image A by applying a second image processing scheme different from the first image processing scheme to the received first image, that is, the raw image. The server 108 may generate a differential image A-B by subtracting the received first corrected image B from the generated second corrected image A, as indicated by reference numeral 613. The server 108 may generate a compressed differential image, that is, the differential image information by compressing the differential image A-B by using the compression module 614. In operation 1413, the server 108 may transmit the differential image information to the electronic device 101.

In operation 1415, the electronic device 101 may generate a third corrected image based on at least the first corrected image and the differential image information. For example, as illustrated in FIG. 15, the decompression module 602 of the electronic device 101 may generate the differential image A-B by decompressing the differential image information, that is, the compressed differential image received from the server 108. The electronic device 101 may generate a third corrected image C by adding the first corrected image B and the differential image A-B as indicated by reference numeral 603. The third corrected image C may be substantially identical to the second corrected image A. The electronic device 101 may compress the third corrected image C, for example, in a JPEG format by using the compression module 604. The electronic device 101 may store the image file in the storage 621 of the memory 130 (e.g., the DRAM 602).

Figure 16:
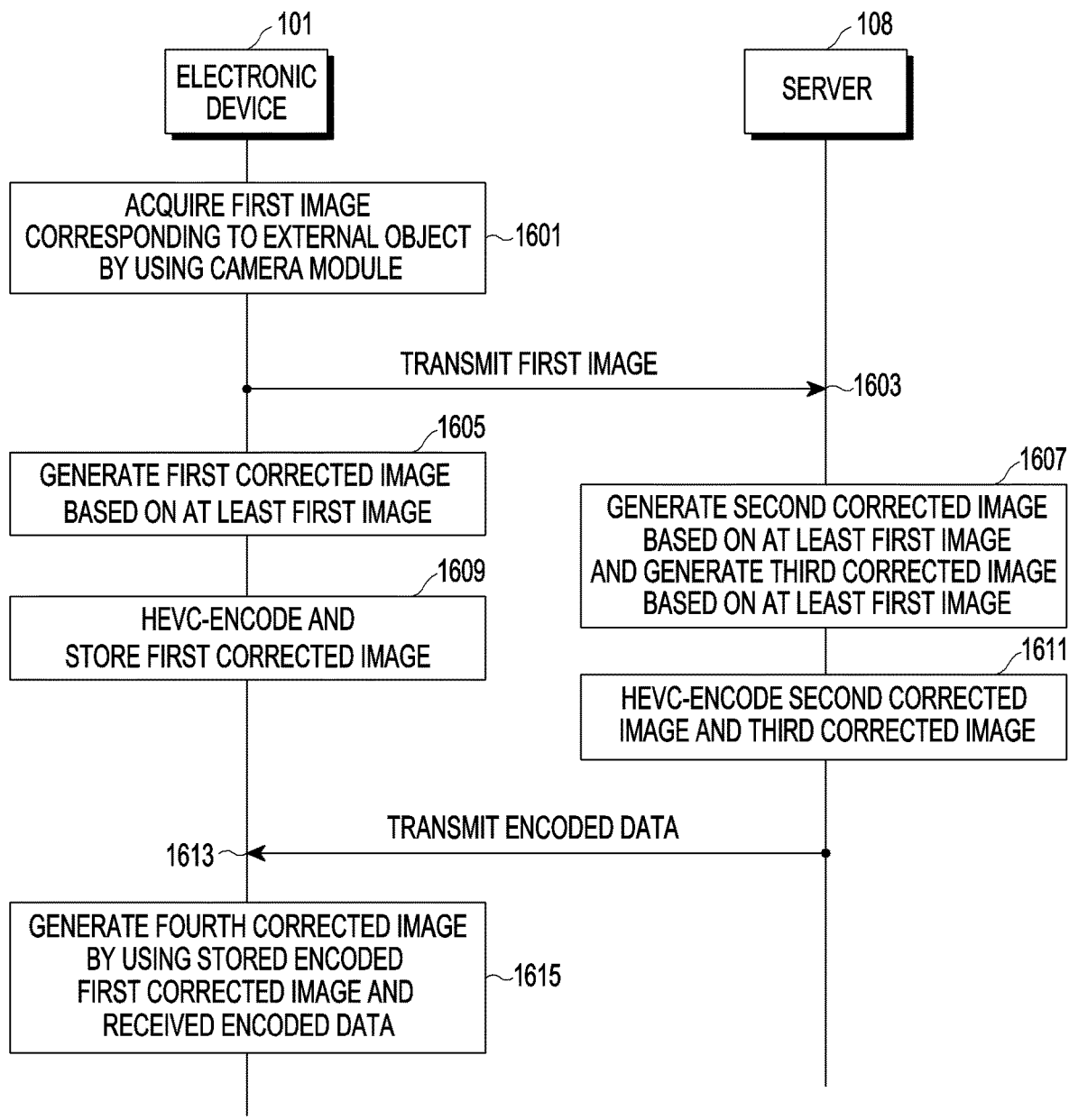
FIG. 16 is a flowchart illustrating a method for operating an electronic device and a server according to various embodiments.
Figure 17:
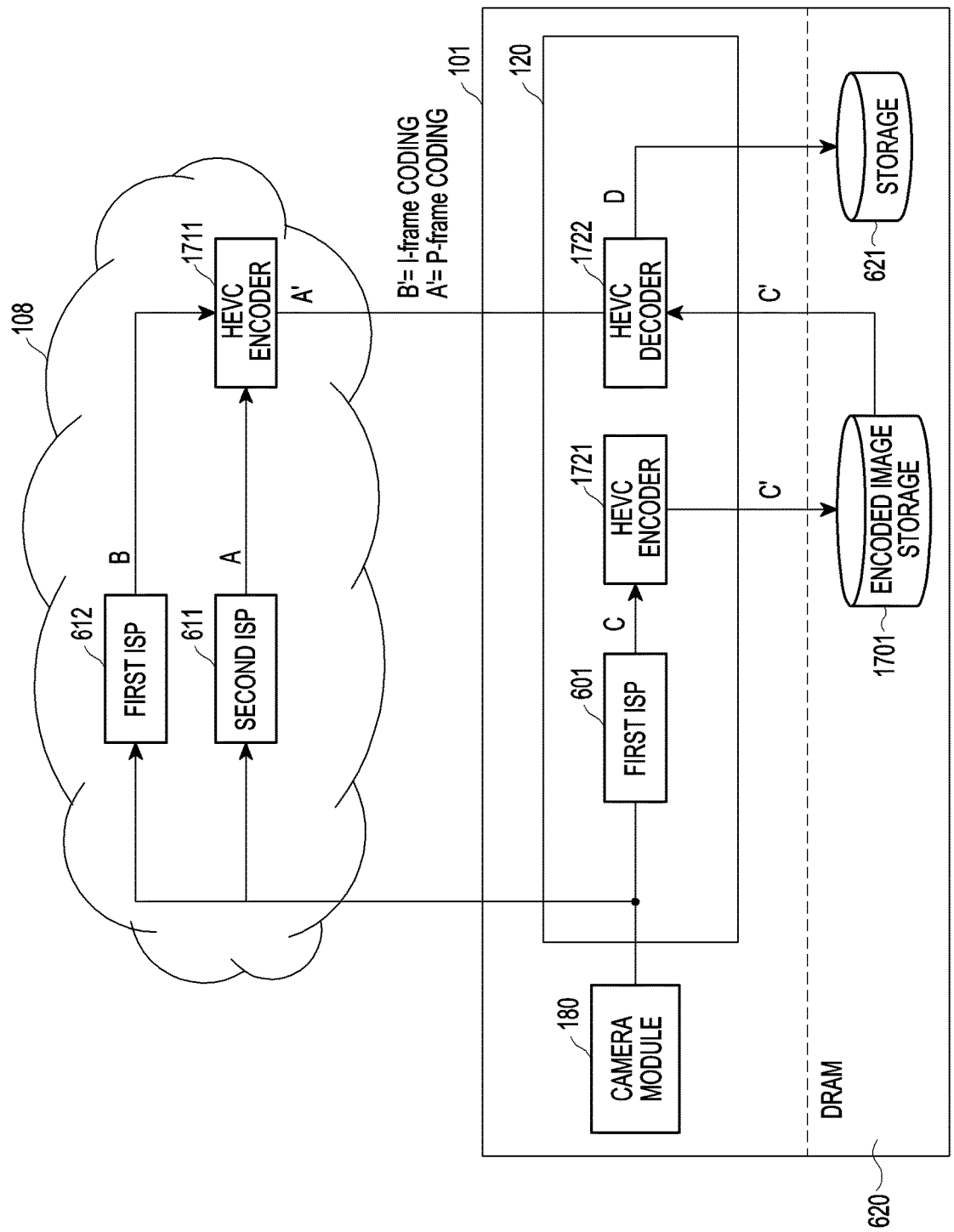
FIG. 17 is a block diagram illustrating an electronic device and a server according to various embodiments.

FIG. 16 is a flowchart illustrating a method for operating an electronic device and a server according to various embodiments. The embodiment of FIG. 16 will be described in greater detail with reference to FIG. 17. FIG. 17 is a block diagram illustrating an electronic device and a server according to various embodiments.

According to various embodiments, the electronic device 101 may acquire a first image corresponding to an external object, that is, a raw image of the external object by using the camera module 180 in operation 1601. In operation 1603, the electronic device 101 may transmit the first image to the server 108. The electronic device 101 may generate a first corrected image based on at least the first image in operation 1605. For example, as illustrated in FIG. 17, the first ISP 601 of the electronic device 101 may generate a first corrected image C by applying a first image processing scheme to the first image. In operation 1607, the server 108 may generate the second corrected image based on at least the first image and generate a third corrected image based on the at least the first image. For example, as illustrated in FIG. 17, the first ISP 612 of the server 108 may generate a second corrected image B by applying the first image processing scheme to the first image. The second ISP 611 of the server 108 may generate a third corrected image A by applying a second image processing scheme different from the first image processing scheme to the first image. The first corrected image C and the second corrected image B may be substantially identical in FIG. 17.

According to various embodiments, the electronic device 101 may encode the first corrected image by high efficiency video coding (HEVC) encoding and store the encoded first corrected image in operation 1609. For example, as illustrated in FIG. 17, an HEVC encoder 1721 of the electronic device 101 may generate a first encoded image C' by applying a predetermined first encoding scheme from among HEVC encoding schemes to the first image. In the first encoding scheme, the first image is subjected to encoding which does not require another frame image (e.g., encoding for generation of an I-frame image). The electronic device 101 may store the first corrected image C' in the memory 130 (e.g., an encoded image storage 1701 of the DRAM 620). In operation 1611, the server 108 may HEVC-encode the second corrected image and the third corrected image. For example, as illustrated in FIG. 17, the HEVC encoder 1711 of the server 108 may apply HEVC encoding to the second corrected image B and the third corrected image A. The server 108 may generate a second encoded image B' by applying the first encoding scheme from among HEVC encoding schemes to the second corrected image B. The server 108 may generate a third encoded image A' by applying a predetermined second encoding scheme from among the HEVC encoding schemes to the third corrected image A. For example, the second encoding scheme may be encoding requiring another frame image (e.g., encoding for generation of a P frame image). The server 108 may encode the third corrected image A, referring to the second corrected image B. The size of the third encoded image A' generated by the second encoding scheme requiring another frame image may be relatively small. The third encoded image A' may be generated based on at least the difference between the second corrected image B and the third corrected image A, and thus may be an example of differential image information. The encoded images may be stored in various formats such as HEVC, and those skilled in the art will appreciate that any encoding scheme can be applied to the disclosure as far as the encoding scheme encodes a video.

According to various embodiments, the server 108 may transmit the encoded data in operation 1613. In operation 1615, the electronic device 101 may generate a fourth corrected image by using the stored first encoded corrected image and the received encoded data. For example, the server 108 may transmit the third encoded image A' to the electronic device 101. An HEVC decoder 1722 of the electronic device 101 may receive the first encoded image C' from the encoded image storage 1701, and the third encoded image A' from the server 108. The HEVC decoder 1722 may decode the first encoded image C' independently, and decode the third encoded image A', referring to the first corrected image C obtained through the decoding, thereby generating a fourth corrected image D. The fourth corrected image D may be substantially identical to the third corrected image A. The electronic device 101 may store the fourth corrected image D in the image storage 621 of the memory 130 (e.g., the DRAM 620).

Figure 18:
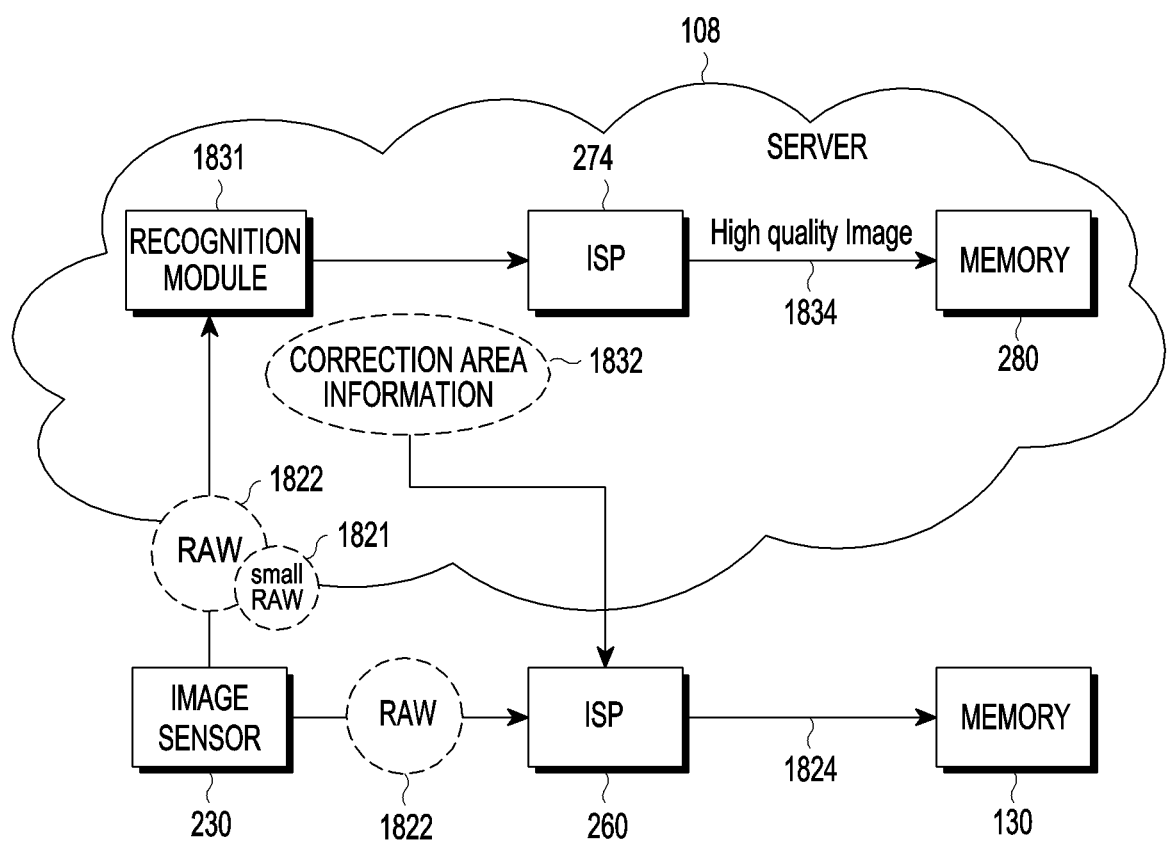
FIG. 18 is a view depicting a method for operating an electronic device and a server according to various embodiments.

FIG. 18 is a view depicting a method for operating an electronic device and a server according to various embodiments.

The electronic device 101 may include the image sensor 230, the ISP 260, and the memory 130. The server 108 may include a recognition module 1831, the ISP 274, and the memory 280. The recognition module 1831 (e.g., at least part of the engine 272) may be a logic module, and may be configured using a processor of the server 108. For example, the processor of the server 108 may perform both recognition and image processing. While not shown, the electronic device 101 may include the communication module 190 capable of transmitting data to and receiving data from the server 108. The server 108 may include the communication module 284 capable of transmitting data to and receiving data from the electronic device 101.

The image sensor 230 may acquire an image of an external object, and generate a raw image 1822 corresponding to the acquired image. The image sensor 230 may transmit the raw image 1822 to the ISP 260. According to various embodiments of the disclosure, the image sensor 230 may generate a lightweight image 1821 and transmit the lightweight image 1821 to the server 108 through the communication module. In another example embodiment, instead of the image sensor 230, the processor of the electronic device 101 may generate the lightweight image 1821 and transmit the lightweight image 1821 to the server 108 through the communication module. The image sensor 230 may compress the lightweight image 1821 and store the compressed lightweight image 1821 in the memory of the image sensor 230, in order to process part of the raw image 1822. The recognition module 1831 of the server 108 may acquire the lightweight image 1821 through the communication module, and segment the lightweight image 1821 into at least one image area. The recognition module 1831 may recognize each of the at least one image area resulting from the segmentation. Correction area information 1832 including at least one of information related to a plurality of image areas generated by the recognition module 1831, for example, information about the coordinates and/or recognition results of the image areas may be generated. For example, the correction area information 1832 as illustrated in FIG. 2D may be transmitted to the electronic device 101. The ISP 260 may correct the raw image 1822 by using the correction area information 1832, thus generating a corrected image 1824. The corrected image 1824 may have, for example, a YUV format. The corrected image 1824 may be stored in the memory 130. Further, the corrected image 1824 may be compressed, for example, in the JPEG format, and the compressed image may be stored in the memory 130.

According to various embodiments, the raw image 1822 provided by the image sensor 230 may be transmitted to the server 108, separately from the lightweight image 1821. Since the raw image 1822 is larger in size than the lightweight image 1821, the lightweight image 1821 may first be transmitted to the server 108, and then the raw image 1822 may be transmitted to the server 108. For example, the raw image 1822 may be transmitted to the server 108 while the ISP 260 is correcting the raw image 1822. The raw image 1822 may be uploaded to the server 108, as generated by the image sensor 230, or after being pre-processed by lens distortion compensation or noise cancellation. The above pre-processing may be performed in the server 108. The server 108 may perform pre-processing for de-mosaicing, image format conversion, and/or increase of an image recognition rate. The ISP 274 of the server 108 may correct the received raw image 1822. The server 108 may correct the raw image 1822 by using the previously generated correction area information 1832, or by using extended correction area information. The raw image 1822 may have a higher resolution than the lightweight image 1821, and thus the server 108 may acquire detailed extended correction area information from the high-resolution image. The ISP 274 may generate the extended correction area information by using both of the previously generated correction area information and the raw image 1822. The ISP 274 may acquire a high-resolution image 1834 by correcting the raw image 1822 by using the extended correction area information. The high-resolution image 1834 may be stored in the memory 280 of the server 108 and downloaded to the electronic device 101. Further, the server 108 may generate a corrected image by applying the same image processing scheme as used in the ISP 260 of the electronic device 101 to the raw image 1822. The server 108 may transmit information about a differential image between the high-resolution image 1834 and the generated corrected image to the electronic device 101. The electronic device 101 may generate the high-resolution image 1834 by using the received differential image information and the corrected image 1824.

The electronic device according to the example embodiments may be one of various types of electronic devices. The electronic devices may include, for example and without limitation, a portable communication device (e.g., a smart phone), a computer device, a portable multimedia device, a portable medical device, a camera, a wearable device, or a home appliance. The electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, a storage medium storing instructions may be provided. The instructions are configured to, when executed by at least one circuit, cause the at least one circuit to perform at least one operation. The at least one operation may include acquiring a raw image of an external object, generating a first corrected image from the raw image by a first image processing scheme, transmitting the raw image to an external electronic device so that the external electronic device generates differential image information corresponding to a difference between a second corrected image and a third corrected image, the second corrected image being generated by processing the raw image in the first image processing scheme, and the third corrected image being generated by processing the raw image in a second image processing scheme, and further correcting the first corrected image by using the differential image information to make the first corrected image correspond to the third corrected image.

According to various embodiments, the generating of the first corrected image may include generating the first corrected image in the first image processing scheme for a first effect corresponding to at least one area of the raw image.

According to various embodiments, the at least one operation may further include receiving the differential image information generated based on the difference between the second corrected image generated in the first image processing scheme and the third corrected image generated in the second image processing scheme, the first image processing scheme being used for the first effect, and the second image processing scheme being used for a second effect corresponding to at least one area of the raw image. The second image processing scheme may require a larger computation volume than the first image processing scheme.

According to various embodiments, the at least one operation may further include receiving, from the external electronic device, compressed differential image information generated by losslessly compressing the differential image information.

According to various embodiments, the at least one operation may further include acquiring the differential image by decompressing the received compressed differential image information based on the lossless compression.

According to various embodiments, the further correction of the first corrected image may include generating an image corresponding to the third corrected image by adding the differential image and the first corrected image.

According to various embodiments, the transmission of the raw image to the external electronic device through the communication module may include generating a compressed raw image by compressing the raw image, and transmitting the compressed raw image to the external electronic device through the communication module.

According to various embodiments, the at least one operation may further include receiving the differential image information generated based on the difference between the second corrected image and the third corrected image, the second corrected image being generated in the first image processing scheme after the compressed raw image is decompressed, and the third corrected image being generated in the second image processing scheme after the compressed raw image is decompressed.

According to various embodiments, the transmission of the raw image to the external electronic device may include transmitting, to the external electronic device, at least one piece of identification information identifying at least one of the electronic device, at least part of information related to the at least one processor, or the first image processing scheme stored in the electronic device.

According to various embodiments, the at least one operation may further include receiving the differential image information generated based on the difference between the second corrected image generated in the first image processing scheme, and the third corrected image, the first image processing scheme being selected based on at least the at least one piece of identification information.

According to various embodiments, the at least one piece of identification information may be included in metadata of the raw image or configured independently of data of the raw image.

According to various embodiments, the at least one operation may further include generating a first encoded image by encoding the first corrected image in a first encoding scheme not requiring another frame image among HEVC encoding schemes.

According to various embodiments, the at least one operation may further include receiving a second encoded image from the external electronic device, the second encoded image being obtained by encoding the third corrected image, referring to the second corrected image, in a second encoding scheme requiring another frame image among the HEVC encoding schemes.

According to various embodiments, the further correction of the first corrected image may include generating an image corresponding to the third corrected image as a result of decoding the second encoded image by encoding the first encoded image and the second encoded image.

According to various embodiments, a storage medium storing instructions may be provided. The instructions are configured to, when executed by at least one circuit, cause the at least one circuit to perform at least one operation. The at least one operation may include receiving a raw image acquired by an external electronic device, generating differential image information corresponding to a difference between a first corrected image and a second corrected image, the first corrected image being generated by processing the raw image in a first image processing scheme set in correspondence with the external electronic device, and the second corrected image being generated by processing the raw image in a second image processing scheme set in correspondence with the electronic device, and transmitting the differential image information to the external electronic device.

According to various embodiments, the generating of the differential image information may include generating compressed differential image information by losslessly compressing the differential image information.

According to various embodiments, the receiving of the raw image may include receiving at least one piece of identification information identifying at least one of the external electronic device, at least part of information related to at least one processor of the external electronic device, or the first image processing scheme stored in the external electronic device, and the generating of the differential image information may include generating the differential image information based on the difference between the first corrected image and the second corrected image, the first corrected image being generated in the first image processing scheme selected based on at least the at least one piece of identification information.

According to various embodiments, the at least one piece of identification information may be included in metadata of the raw image or configured independently of data of the raw image.

According to various embodiments, the generating of the differential image information may include generating an encoded image by encoding the second corrected image in a second encoding scheme requiring another frame image among HEVC encoding schemes, referring to the first corrected image, and the transmission of the differential image information may include transmitting the encoded image to the external electronic device.

According to various embodiments, a storage medium storing instructions may be provided. The instructions are configured to, when executed by at least one circuit, cause the at least one circuit to perform at least one operation. The at least one operation may include acquiring a raw image of an external object by using the camera, generating a first converted image by converting a format of the raw image to a predetermined format, transmitting the raw image to the external electronic device through the communication module, receiving differential image information between a second converted image and a first corrected image from the external electronic device through the communication module, the second converted image being generated by converting the format of the raw image to the predetermined format, and the first corrected image being generated by applying an image processing scheme stored in the external electronic device to the raw image, and generating a second corrected image corresponding to the first corrected image by using the received differential image information and the first converted image.

According to various embodiments, each component (e.g., a module or a program) of the above-described components may include a single entity or multiple entities. According to an example embodiment, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, an electronic device and a method for operating the electronic device according to various example embodiments may be provided, in which a raw image is transmitted to a cloud server, the difference between a raw image and a corrected image which it may be difficult or take much time to obtain in an ISP of the electronic device is received from the cloud server, and the image corrected by the cloud server is generated by using the raw image and the difference. Accordingly, even though the electronic device does not support a latest correction algorithm or includes a low-specification ISP, image correction which is possible by the latest algorithm or a high-specification electronic device may be performed.

While the disclosure has been shown and described with reference to certain example embodiments thereof, it will be understood by those skilled in the art that various changes in form and details may be made therein without departing from the spirit and scope of the disclosure as defined by the appended claims and their equivalents.

What is claimed is:

1. An electronic device comprising:
a camera;
a communication module including communication circuitry; and
at least one processor,
wherein the at least one processor is configured to:
acquire a raw image of an external object by using the camera,
generate a first corrected image from the raw image by a first image processing scheme,
control the communication module to transmit the raw image to an external electronic device,
control the communication module to receive differential image information from the external electronic device, wherein the differential image information corresponds to a difference between the first corrected image generated by processing the raw image in the first image processing scheme and a second corrected image generated by processing the raw image in a second image processing scheme based on correction area information for a plurality of regions of the raw image, and wherein the correction area information is identified based on recognition results of objects corresponding to the plurality of regions, and
generate the second corrected image from the first corrected image by using the correction area information corresponding to the differential image information.

2. The electronic device of claim 1, wherein the first image processing scheme provides a first effect for at least one area of the raw image.

3. The electronic device of claim 2, wherein the first image processing scheme is used for the first effect, and the second image processing scheme is used for a second effect for at least one area of the raw image, and
wherein the second image processing scheme requires a larger computation volume than the first image processing scheme.

4. The electronic device of claim 1, wherein the received differential image information comprises compressed differential image information generated by losslessly compressing the differential image information.

5. The electronic device of claim 4, wherein the at least one processor is configured to acquire the differential image by decompressing the received compressed differential image information based on the lossless compression.

6. The electronic device of claim 5, wherein the at least one processor is configured to generate the second corrected image by adding the differential image and the first corrected image.

7. The electronic device of claim 1, wherein the at least one processor is configured to generate a compressed raw image by compressing the raw image, and to control the communication module to transmit the compressed raw image to the external electronic device.

8. The electronic device of claim 7, wherein the first corrected image is generated in the first image processing scheme after the compressed raw image is decompressed, and the second corrected image is generated in the second image processing scheme after the compressed raw image is decompressed.

9. The electronic device of claim 1, wherein the at least one processor is configured to control the communication module to transmit, to the external electronic device, at least one piece of identification information identifying at least one of the electronic device, at least part of information related to the at least one processor, or the first image processing scheme stored in the electronic device.

10. The electronic device of claim 9, wherein the first image processing scheme is selected based on at least the at least one piece of identification information.

11. The electronic device of claim 10, wherein the at least one piece of identification information is included in metadata of the raw image or configured independently of data of the raw image.

12. The electronic device of claim 1, wherein the at least one processor is configured to generate a first encoded image by encoding the first corrected image in a first encoding scheme not requiring another frame image among high efficiency video coding (HEVC) encoding schemes.

13. The electronic device of claim 12, wherein the at least one processor is configured to control the communication module to receive a second encoded image from the external electronic device, the second encoded image being obtained by encoding the second corrected image, referring to the first corrected image, in a second encoding scheme requiring another frame image among the HEVC encoding schemes.

14. The electronic device of claim 13, wherein the at least one processor is configured to decode the second encoded image to generate an image corresponding to the second corrected image.

15. An electronic device comprising:
a communication module including communication circuitry; and
at least one processor,
wherein the at least one processor is configured to:
control the communication module to receive a raw image acquired by an external electronic device,
generate differential image information corresponding to a difference between a first corrected image and a second corrected image, the first corrected image being generated by processing the raw image in a first image processing scheme set in correspondence with the external electronic device, and the second corrected image being generated by processing the raw image in a second image processing scheme set in correspondence with the electronic device based on correction area information for a plurality of regions of the raw image, wherein the correction area information is identified based on recognition results of objects corresponding to the plurality of regions, and
control the communication module to transmit the differential image information to the external electronic device.

16. The electronic device of claim 15, wherein the at least one processor is configured to generate compressed differential image information by losslessly compressing the differential image information and control the communication module to transmit the compressed differential image information to the external electronic device.

17. The electronic device of claim 15, wherein the at least one processor is configured to control the communication module to receive at least one piece of identification information identifying at least one of the external electronic device, at least part of information related to at least one processor of the external electronic device, or the first image processing scheme stored in the external electronic device, and
wherein the at least one processor is configured to generate the differential image information based on the difference between the first corrected image and the second corrected image, the first corrected image being generated in the first image processing scheme selected based on at least the at least one piece of identification information.

18. The electronic device of claim 17, wherein the at least one piece of identification information is included in metadata of the raw image or configured independently of data of the raw image.

19. The electronic device of claim 15, wherein the at least one processor is configured to generate an encoded image by encoding the second corrected image in a second encoding scheme requiring another frame image among HEVC encoding schemes, referring to the first corrected image, and control the communication module to transmit the encoded image to the external electronic device.

20. An electronic device comprising:
a camera;
a communication module including communication circuitry; and
at least one processor,
wherein the at least one processor is configured to:
acquire a raw image of an external object by using the camera,
generate a first converted image by converting a format of the raw image to a predetermined format,
control the communication module to transmit the raw image to the external electronic device,
control the communication module to receive differential image information corresponding to a difference between the first converted image and a first corrected image from the external electronic device the first corrected image being generated by processing the raw image in an image processing scheme stored in the external electronic device based on correction area information for a plurality of regions of the raw image, wherein the correction area information is identified based on recognition results of objects corresponding to the plurality of regions, and generate a second corrected image corresponding to the first corrected image by using the received differential image information and the first converted image.

* * * * *